(12) United States Patent
Boyce et al.

(10) Patent No.: US 12,278,995 B2
(45) Date of Patent: Apr. 15, 2025

(54) METHODS AND APPARATUS TO SIGNAL ENABLED VIEWS PER ATLAS IN IMMERSIVE VIDEO

(71) Applicant: Intel Corporation, Santa Clara, CA (US)

(72) Inventors: Jill Boyce, Portland, OR (US); Basel Salahieh, Santa Clara, CA (US)

(73) Assignee: Intel Corporation, Santa Clara, CA (US)

(*) Notice: Subject to any disclaimer, the term of this patent is extended or adjusted under 35 U.S.C. 154(b) by 163 days.

(21) Appl. No.: 17/908,227

(22) PCT Filed: Mar. 26, 2021

(86) PCT No.: PCT/US2021/024488
§ 371 (c)(1),
(2) Date: Aug. 30, 2022

(87) PCT Pub. No.: WO2021/202310
PCT Pub. Date: Oct. 7, 2021

(65) Prior Publication Data
US 2023/0156229 A1 May 18, 2023

Related U.S. Application Data

(60) Provisional application No. 63/003,131, filed on Mar. 31, 2020.

(51) Int. Cl.
*H04N 19/70* (2014.01)
*H04N 19/117* (2014.01)
(Continued)

(52) U.S. Cl.
CPC .......... *H04N 19/70* (2014.11); *H04N 19/117* (2014.11); *H04N 19/132* (2014.11); *H04N 19/167* (2014.11); *H04N 19/597* (2014.11)

(58) Field of Classification Search
CPC .... H04N 19/597; H04N 19/70; H04N 19/167; H04N 19/117; H04N 19/132;
(Continued)

(56) References Cited

U.S. PATENT DOCUMENTS

2013/0279589 A1* 10/2013 Gu .................... H04L 65/70
375/240.01
2018/0367788 A1 12/2018 Haimovitch-Yogev et al.
(Continued)

FOREIGN PATENT DOCUMENTS

JP 2021506175 A 2/2021
JP 2023506832 A 2/2023
(Continued)

OTHER PUBLICATIONS

Kroon, "Report of the BoG on Immersive Video," MPEG 128, ISO/IEC, JTC1/SC29/WG11, MPEG/M51454, URL: [http://phenix.int-evry.fr/mpeg/doc_end_user/documents/128_Geneva/wg11/m51454-v6-BoGonimmersiveVideo.zip], Oct. 2019, 20 pages.
(Continued)

*Primary Examiner* — Nathnael Aynalem
(74) *Attorney, Agent, or Firm* — Hanley, Flight & Zimmerman, LLC

(57) ABSTRACT

Methods, apparatus, systems and articles of manufacture to sample enabled views per atlas in immersive video are disclosed. An example apparatus includes an interface to obtain a bitstream corresponding to an immersive video; a bitstream analyzer to determine that metadata corresponding to an atlas of the bitstream identifies that at least part of a view of interest corresponds to the atlas, the metadata included in the bitstream; and a filter to generate a filtered bitstream by removing atlases that do not identify at least part of a view of interest from the bitstream, the interface to provide the filtered bitstream to a decoder.

25 Claims, 9 Drawing Sheets

(51) Int. Cl.
    *H04N 19/132*  (2014.01)
    *H04N 19/167*  (2014.01)
    *H04N 19/597*  (2014.01)

(58) Field of Classification Search
    CPC .... H04N 19/14; H04N 19/157; H04N 19/169; H04N 19/182; H04N 19/20; H04N 19/46; H04N 19/65; H04N 19/85; G06T 7/50; G06V 10/54; G06V 10/56
    USPC .................. 375/240–240.29; 348/14.13, 43
    See application file for complete search history.

(56) References Cited

U.S. PATENT DOCUMENTS

| | | | | |
|---|---|---|---|---|
| 2020/0154121 | A1* | 5/2020 | Boyce | H04N 19/132 |
| 2020/0413094 | A1* | 12/2020 | Lee | H04N 19/167 |
| 2021/0006830 | A1* | 1/2021 | Yun | H04N 19/176 |
| 2021/0099687 | A1* | 4/2021 | Shin | H04N 19/37 |

FOREIGN PATENT DOCUMENTS

| | | | |
|---|---|---|---|
| WO | 2018130491 | A1 | 7/2018 |
| WO | 2019079032 | A1 | 4/2019 |
| WO | 2019231178 | A1 | 12/2019 |
| WO | 2020013975 | A1 | 1/2020 |
| WO | 2021122881 | A1 | 6/2021 |

OTHER PUBLICATIONS

Wang et al., "Culling of Subblocks for Viewport Rendering in Immersive Video," MPEG 129, ISO/IEC, JTC1/SC29/WG11, MPEG2019/m, URL:[http://phenix.int-evry.fr/mpeg/doc_end_user/documents/129_Brussels/wg11/m52320-v1-Cullingofsubblocksforimmersivevideorende ring.zip], Jan. 2020, 8 pages.

Salahieh et al., "Test Model 4 for Immersive Video," MPEG 129, ISO/IEC, JTC1/SC29/WG11, N19002, URL:[http://phenix.int-evry.fr/mpeg/doc_end_user/documents/129_Brussels/wgll/w19002.zip], Feb. 29, 2020, 45 pages.

ISO/IEC, "Working Draft 4 of Immersive Video," MPEG 129, ISO/IEC, JTC1/SC29/WG11, N19001, URL:[http://phenix.int-evry.fr/mpeg/doc_end_user/documents/129_Brussels/wgll/w19001.zip], Feb. 28, 2020, 74 pages.

Boyce et al., "Signaling of Enabled Views Per Atlas," MPEG 130, ISO/IEC, JTC1/SC29/WG11, URL:[http://phenix.int-evry.fr/mpeg/doc_end_user/documents/130_Alpbach/wg11/m53042-v1-M53402viewsperatlas.zip], Apr. 2020, 6 pages.

Yu et al., "Report On 23090-12 Immersive Video (MIV) Related Activities," MPEG 130, ISO/IEC, JTC1/SC29/WG11, MPEG/M52953, URL:[http://phenix.int-evry.fr/mpeg/doc_end_user/documents/130_Alpbach/wg11/m52 953-v24-m52953-v24MIVreport.zip], Apr. 2020, 58 pages.

International Searching Authority, "International Preliminary Report on Patentability," issued in connection with International Patent Application No. PCT/US2021/024488, issued on Sep. 29, 2022, 5 pages.

European Patent Office, "Extended European Search Report," issued in connection with European Patent Application No. 21779791.9, dated Feb. 13, 2024, 12 pages.

International Searching Authority, "International Search Report and Written Opinion," issued in connection with PCT Application No. PCT/US2021/024488, dated Jul. 9, 2021, 7 pages.

Salahieh et al., "Multi-Pass Renderer in MPEG Test Model for Immersive Video," 2019 Picture Coding Symposium, Nov. 12-15, 2019, 5 pages.

Japanese Patent Office, "Search Report by Registered Organization," issued in connection with Japanese Patent Application No. 2022-552358, dated Jan. 29, 2025, 29 pages. [English translation included].

Japanese Patent Office, "Decision to Grant a Patent," issued in connection with Japanese Patent Application No. 2022-552358, dated Feb. 4, 2025, 5 pages. [English translation included].

* cited by examiner

METHODS AND APPARATUS TO SIGNAL ENABLED VIEWS PER ATLAS IN IMMERSIVE VIDEO

RELATED APPLICATION

This patent arises from the national stage of International Application No. PCT/US21/24488, which was filed on Mar. 26, 2021, which claims the benefit of U.S. Provisional Application No. 63/003,131, which was filed on Mar. 31, 2020. International Application No. PCT/US21/24488 and U.S. Provisional Application No. 63/003,131 are hereby incorporated herein by reference in their entireties. Priority to International Application No. PCT/US21/24488 and U.S. Provisional Application No.

BACKGROUND

In video compression/decompression (codec) systems, compression efficiency and video quality are important performance criteria. For example, visual quality is an important aspect of the user experience in many video applications. Compression efficiency impacts the amount of memory needed to store video files and/or the amount of bandwidth needed to transmit and/or stream video content. A video encoder typically compresses video information so that more information can be sent over a given bandwidth or stored in a given memory space or the like. The compressed signal or data is then decoded by a decoder that decodes or decompresses the signal or data for display to a user. In most examples, higher visual quality with greater compression is desirable.

Currently, standards are being developed for immersive video coding and point cloud coding including the Video-based Point Cloud Compression (V-PCC) and MPEG Immersive Video Coding (MIV). Such standards seek to establish and improve compression efficiency and reconstruction quality in the context of immersive video and point cloud coding.

Figure 1:
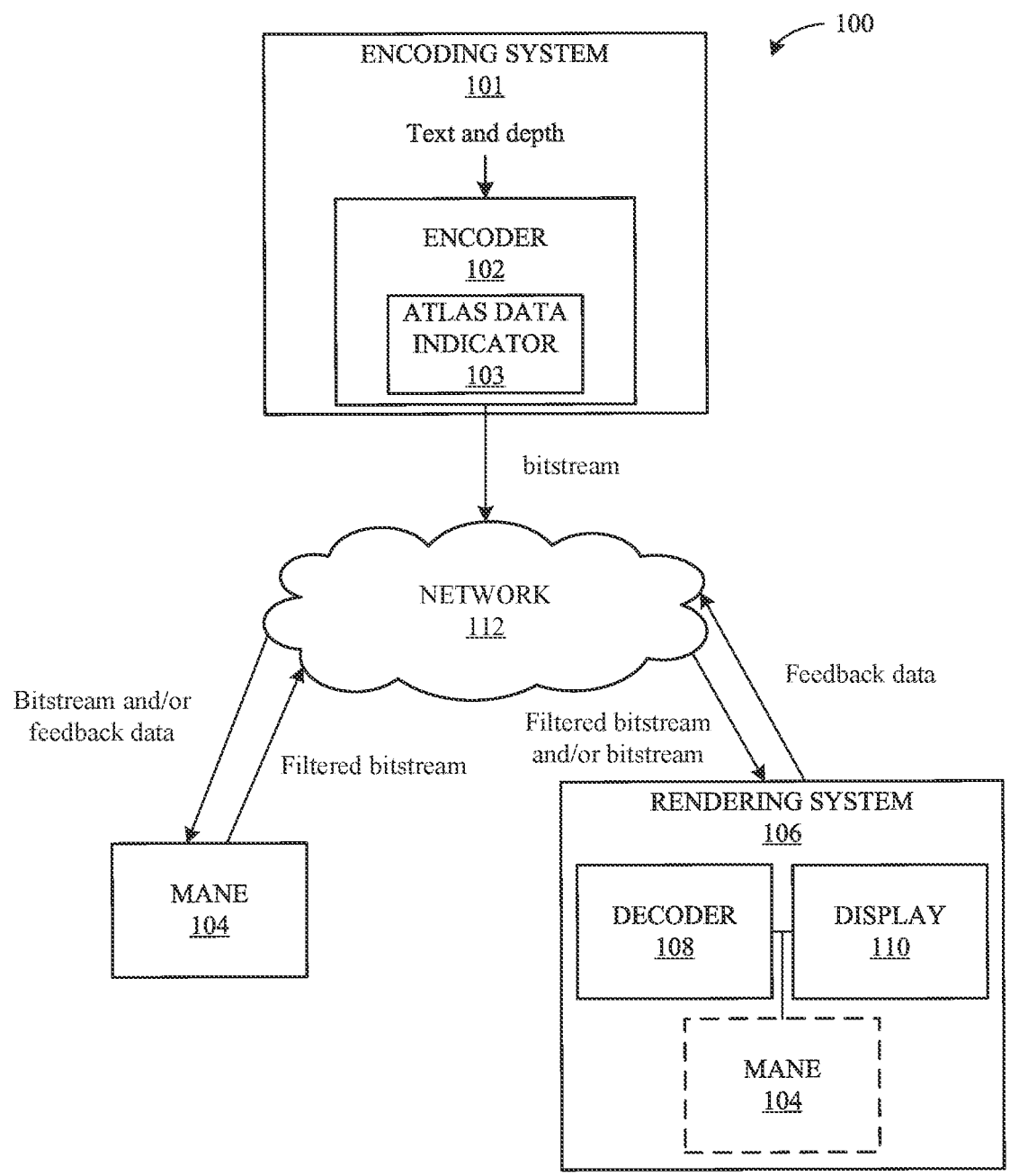
FIG. 1 is an example environment for filtering a bitstream.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts. Although the figures show layers and regions with clean lines and boundaries, some or all of these lines and/or boundaries may be idealized. In reality, the boundaries and/or lines may be unobservable, blended, and/or irregular.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

In the context of immersive video coding and point cloud coding, video standards such as the Visual Volumetric Video-based Coding (V3C) and Video-based Point Cloud Compression (V-PCC) and the MPEG Immersive Video Coding (MIV) may be utilized. An immersive video is a video that supports a plurality of views per frame, with the plurality of views corresponding to different positions, orientations, etc. When immersive video is displayed, many different views corresponding to the immersive video are provided to a display. For example, in a 360 degree video, a rendering system can obtain a bitstream corresponding to a 360 degree video and output views that correspond to the orientation of the display (e.g., as a display corresponding to a 90 degree window rotates, views corresponding to the 90 degree window based on the rotation are displayed so that the rendering system can view the entire 360 degree video in the 90 degree window by rotating the device around the 360 degree landscape).

In V3C/V-PCC, dynamic point clouds are compressed using multiple projections of point clouds onto planes for texture, such as color, and for geometry, such as depth. After the dynamic point clouds are compressed, the compressed dynamic point clouds are segmented to extract rectangular regions, also referred to as patches, of similar depths from the projection plane. The patches are packed into atlases or atlas tiles with an occupancy map. The occupancy map indicates parts of the atlases that are to be used (e.g., occupied regions within the patches packed in the atlases). Additionally, patch information metadata is used to indicate how patches are mapped between the projection plans and the canvas (e.g., atlases or atlas tiles). A two dimensional (2-D) video codec, such as High Efficiency Video Coding (HEVC), is used to exploit the spatial and temporal redundancy of geometry and texture components of the canvas. The information about the sizes and positions of the patches in the original projections and in the atlases or atlas tiles are signaled as coded atlas tile data. Occupancy information is also signaled. The atlas can be subdivided into a grid of non-overlapping blocks of data, and the block size may be included in the bitstream. The atlas data includes a patch value per block indication (e.g., a patch identification and/or index of a block of data). The block may correspond to the patch or may be a subset of the patch. In some examples, patches overlap with other patches. The order in which the patch data is signaled in the bitstream (e.g., which corresponds to the patch identifier) is used to determine the patch precedence at a particular block location, for example, the patch of the higher patch identifier value may take precedence.

In coding via the V3C/V-PCC and MIV standards, rectangular patches are formed from projected views and arranged into atlases. Patches may overlap within an atlas, and the last signaled patch takes precedence for resolving overlaps. The standards define a signaling mechanism to send, for each patch in an atlas, coded atlas data including information including the size and position of the patch in its corresponding projected view and/or a patch identifier. Atlas data is a mapping of blocks of data to patches in each atlas. In some examples, such information is included within a coded atlas tile data syntax structure. Coded atlas data can be decoded by a decoder to obtain the atlas data. In some examples, the coded atlas tile data syntax structure is signaled at each frame time or instance. In some examples, the coded atlas tile data syntax structure persists for multiple consecutive frame times or instances. Multiple coded atlas tile data syntax structures, corresponding to different atlases or atlas tiles, may be signaled within the same access unit (e.g., a portion of components of the bitstream (e.g., atlas data, texture video, geometry video, occupancy video, etc.) that have the same decoding order count (e.g., data of the V-PCC/MIV bitstream that corresponds to a particular time instance)), all of which correspond to the same frame time, instance, or Picture Order Count (POC) value.

Multiple atlases may be used for MIV. In MIV, the arrangement of patches into atlases may persist for multiple frame times. Persistence corresponds to how long data corresponding to the atlases can persist before the data is to be replaced by additional data. In examples disclosed herein, a supplemental enhancement information (SEI) message including an identification of views that are potentially included in respective atlases is provided. Such a message may be implemented in the MIV standard, the V3C/V-PCC standard, and/or any other standard that generates messages included in bitstreams.

To send the image data (e.g., which includes the different views that correspond to the immersive video and/or image), an encoder first encodes the texture and/or depth data corresponding to an image or frame. For example, an encoder may break the multiple views (e.g., image data corresponding to a section of the immersive video) into patches of data and encode the patches of data into one or more atlases. The atlases are transmitted in a bitstream to the decoding device. After obtaining the bitstream, the decoding device decodes the atlases to render one or more viewports of interest, on a display, by first decoding one or more target views.

In traditional immersive video coding systems, the decoding device obtains and decodes all the atlases in a bitstream corresponding to all the views of the immersive video. However, the renderer in the decoding device only utilizes views of interest (e.g., the views close to the rendered viewport that will be displayed). For example, typically only a portion of the views are visible when one or more viewports are displayed on a display at a time, thereby leaving one or more other portions of decoded views that are not used for rendering. Thus, resources (e.g., bandwidth, processing resources, memory resources, etc.) are wasted to obtain and decode such unused views in atlases of a bitstream.

Examples disclosed herein conserve resources using a media aware network element (MANE) to filter out atlases that will not be utilized by a decoding device. In this manner, the decoding device only decodes atlases that correspond to view(s) of interest (e.g., that may be used in the rendering process to render a viewport. for display). The disclosed MANE obtains feedback data (e.g., views of interest, viewport data, extrinsic parameters, etc.) from the rendering system and the bitstream is routed through the MANE. In this manner, the MANE can process the SEI messages, metadata, etc. corresponding to atlases of the bitstream to determine which atlases of the bitstream are needed at the rendering system and filters out atlases that are not needed. The MANE outputs the filtered bitstream to the example rendering system so that the rendering system can decode and render a viewpoint corresponding to the filtered bitstream with less resources that is needed for the full bitstream.

An encoder may break a view into patches. In some examples, all of the patches for the view may be included in an atlas. In some examples, the patches for the view are included in multiple different atlases (e.g., a first set of patches in a first atlas and a second set of patches in a second atlas). To assist the filtering process, examples disclosed herein provide a syntax for SEI messages, metadata, etc., that correspond to an atlas to identify which atlases may correspond to different views. For example, examples disclosed herein include a syntax element corresponding to a complete flag(s) that identifies whether an entire view is included in an atlas. Examples disclosed herein further include an enabled flag(s) that identify whether an atlas may have patch(es) corresponding to particular view(s). In this manner, the MANE can process the SEI message, metadata, etc. corresponding to atlases of a bitstream to determine which atlases correspond to view(s) of interest and filter out the at least that do not correspond the view(s) of interest.

FIG. 1 is an example environment 100 to signal enabled views per atlas in immersive video. The example environment includes an example encoding system 101, an example encoder 102, an example atlas data indicator 103, an example MANE 104, an example rendering system 106, an example decoder 108, an example display 110, and an example network 112.

The example encoding system 101 (also referred to as encoder, encoding device, etc.) of FIG. 1 and the example rendering system 106 may be implemented in any suitable form factor device or one or more of such devices including a server computer, a cloud computing environment, personal computer, a laptop computer, a tablet, a phablet, a smart phone, a gaming console, a wearable device, a display device, an all-in-one device, a two-in-one device, etc. Although the example encoding system 101 and the example rendering system 106 of FIG. 1 is implemented in different computing devices, the example encoding system 101 and the rendering system 106 may be implemented in the same device.

The encoding system 101 of FIG. 1 includes the example encoder 102 to receive text and depth information corresponding to multiple views of input video to encode. There may be any number of views of a scene and each one of the views may include a corresponding texture picture or frame (or texture video) and a corresponding geometry picture or frame (or geometry video). For each time instance, video data for one or more views of a scene are provided such that multiple texture frames and multiple depth or geometry frames may be generated. For example, each texture frame may include per pixel color information such as brightness/color (YUV) data, red green, blue (RGB) data, or similar data and each geometry or depth frame may include per pixel depth data or similar data. The texture and geometry frames may have the same or differing resolutions. For example, the texture frames may be video graphics array (VGA), high definition (HD), Full-HD (e.g., 1080p), 4K resolution video, 8K resolution video, or the like. Example disclosed herein are described with respect to frames and pictures (which are used interchangeably).

The example encoder 102 of FIG. 1, for a particular frame index or instance, generates (e.g., converts from the input views) a texture atlas and a geometry or depth atlas. For example, the encoder 102 breaks down each of the multiple views into patches (e.g., rectangular regions) that are arranged to form an atlas. The encoder 102 may format the atlas to reduce redundancy among the multiple views. The example encoder 102 forms a texture atlas (including texture information) and a geometry or depth atlas (including geometry or depth information).

The example encoder 102 of FIG. 1 also determines, for the particular frame index or instance, atlas data that includes metadata indicating the source of each patch (e.g., the corresponding view associated with that patch) in the texture and the depth atlas. In some examples, the encoder 102 generates a single instance of atlas data for the texture and depth atlases such that the patches of the depth atlas follow or match the patches of the texture atlas, and vice versa. The atlas data provides metadata for the reconstruction of the multiple views (or portions thereof) using the texture and depth patch data in the atlases. As used herein, the term atlas data indicates any data structure indicative of the sources of patches of the texture and depth atlases, such as 2-dimensional array of numerical values indicative of the source of such patches. In some examples, the atlas data includes a patch identifier (or a default value (e.g., as the highest available value in the data structure) if the pixel does not correspond to a patch. In some examples, the encoder 102 generates the atlas data to include a pixel-wise numerical values each indicative of a source view of the pixel (or a default value if the pixel does not correspond to a source view). After generating the bitstream (e.g., the encoded atlases and corresponding SEI messages and/or metadata), the example encoding system 101 transmits the bitstream to the example MANE 104 via the example network 112.

The example encoder 102 of FIG. 1 includes the example atlas data indicator 103. The example atlas data indicator 103 generates an SEI message, metadata, etc. corresponding to a particular atlas. The atlas data indicator 103 includes element(s) in the syntax of the SEI message, metadata, etc. that correspond to whether a view is completely or partially included in the atlas. For example, the atlas data indicator 103 can include an element that includes a value that corresponds to whether a view is completely included in the alas (e.g., all of the patches corresponding to the view are included in the atlas) and/or if one or more of the patches corresponding to a view is potentially included in the atlas. The example atlas data indicator 103 may set flags and/or values that indicate whether the views of an atlas are complete views and/or enabled view(s) by setting value(s) of the element that corresponds to the complete views and/or the enabled views. In some examples, the atlas data indicator 103 sets flags, referred to herein as complete flags or a complete array (e.g., array include value and/or flags), to indicate whether all the patch(es) corresponding to a view is(are) included in a single atlas. For example, if the atlas indicator 103 determines that a first view is completely included in a particular atlas, the atlas indicator 103 indicates (e.g., by setting one or more value(s) in an element of the syntax of an SEI message, metadata, etc.) that the first view is completely included in the particular atlas. In some examples, the atlas data indicator 103 determines, for a particular atlas, the views associated with the patches that may be included in the particular atlas (e.g., whether one or more views are enabled for the particular atlas). The example atlas data indicator 103 generates an enabled array of data corresponding to whether each view is enabled for the atlas (e.g., a bit per view corresponding to whether each view is potentially included in the atlas). For example, if an atlas potentially includes patches corresponding to views 2, 5, and 8, the atlas data indicator 103 indicates views 2, 5, and 8 are associated with that atlas by setting the elements of the enabled array for that atlas that correspond to views 2, 5 and 8 to a first value (e.g., '1') and setting the remaining elements to a second value ('0'). In this manner, when the MANE 104 obtains the bitstream, the MANE 104 can process the corresponding SEI message (from the bitstream) corresponding to the atlases to determine which atlases correspond to views of interest (e.g., based on complete and/or enabled indications). During encoding, the encoder 102 may allow a particular view to be stored across two or more atlases. However, due to generation and processing of the atlases, the patches corresponding to particular views (e.g., even though the encoder 102 may select two atlases for a particular view, it may not be efficient or possible to store the view across the two atlases). Accordingly, the enabled array includes values or flags indicative of views that may potentially be included in an atlas, but are not necessarily included in the atlas. Such flags or values are referred to herein as enable flags or enabled value. The example encoder 102 includes the complete flag/value and/or array of enable flags/values in the syntax of the SEI message, metadata, etc. corresponding to the respective atlas.

Figure 2:
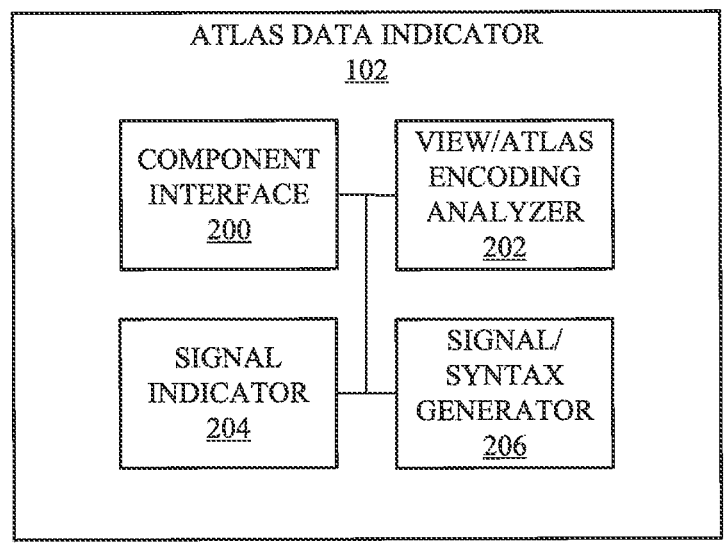
FIG. 2 is a block diagram of an example implementation of an example atlas data indicator included in the environment of FIG. 1.

In some examples the atlas data indicator 103 of FIG. 2 sets a flag, a value, or an indication value that represents full occupancy. When patches are included in an atlas, some of the pixels may be occupied (e.g., including data related to the image at the pixel location) and others may not be occupied (e.g., include null data). Traditionally, the SEI message and/or metadata corresponding to an atlas would have an occupancy array that has a single value corresponding to each pixel stored in the atlas. If the pixel is occupied, the encoder 102 would indicate the occupancy with a first value for corresponding element of the occupancy array. If the pixel is not occupied, the encoder 102 would indicate that the pixel is not occupied with a second value for the corresponding element of the occupancy array. The example atlas data indicator 103 includes a full occupancy flag/value in the syntax of an SEI message, metadata, etc. to indicate whether all of the pixels in an atlas are occupied (e.g., a fully occupied flag/value). In this manner, if the atlas is fully occupied, only one bit is needed to indicate the occupancy status of all the pixels in the atlas (e.g., as opposed to N bits for the N pixels), thereby reducing bandwidth and/or resources need to send/receive the atlas. Additionally or alternatively, there may be per patch occupancy flags/values. In this manner, the full occupancy of the pixels per patch may be indicated in SEI message, metadata, etc., using the full occupancy flag. If the atlas/patch is not fully occupied, a per pixel occupied status may be used. The example atlas data indicator 103 is further described below in conjunction with FIG. 2.

The example MANE 104 of FIG. 1 accesses the bitstream from the encoding system 101 and filters out atlases that the rendering system 106 does not need based on feedback from the example rendering system 106. Although the example MANE 104 is implemented as a standalone device, the example MANE 104 may be implemented in the example rendering system 106. For example, the MANE 104 may receive views of interest from the rendering system 106 (e.g., the view that the rendering system 106 is interested in rendering). In some examples, the MANE 104 obtains a desired viewport position and viewport orientation from the rendering system 106 and the MANE 104 determines the position of the closest views using view camera extrinsic parameters, for example. Additionally, the MANE 104 may select a subset of the available views that are closest to the position and/or orientation of the desired viewpoint. The MANE 104 may determine the closest view position by calculating a three dimensional distance and the angular deviation between the center of the view camera and the center of the desired viewport. After the two centers are selected, the MANE 104 selects the view(s) with the smallest distances (e.g., a threshold number of view with the smallest distances and/or any view with a distance less than a threshold). In some examples, the MANE 104 may select complete views that do not satisfy the above-thresholds if the complete view contains information that is helpful to reconstruct a target viewpoint. For example, the MANE 104 and/or a user may prefer (a) complete views over closer incomplete views, (b) intra-coded pictures over inter-coded pictures (e.g., which may be indicated in the video codec sliver header).

After the MANE 104 of FIG. 1 obtains and/or determines the views of interest (e.g., based on the feedback data from the rendering system 106 and/or a user via the rendering system 106), the MANE 104 identifies the atlases that correspond to view(s) of interest. For example, the MANE 104 processes the SEI message(s), metadata, etc., corresponding to the respective atlases to determine if a complete flag is included corresponding to any of the view(s) of interest. If a complete view flag corresponding to one or more view(s) of interest is set in one or more of the atlas(es), the MANE 104 determines, selects, and/or otherwise identifies those atlas(es) for decoding and/or to be included in the filtered stream. Additionally, the example MANE 104 processes the SEI message, metadata, etc., corresponding to the corresponding atlas to determine if an enabled flag is included corresponding to any of the view(s) of interest. If an enabled view flag corresponding to one or more view(s) of interest is set in one or more of the atlas(es), the MANE 104 determines that atlas(es) should be included in the filtered bitstream as well. In this manner, the MANE 104 determines all the atlas(es) that may include information (e.g., patches) related to view(s) of interest. After the atlases to include in the filtered bitstream are determined (e.g., selected), the example MANE 104 filters out some or all of the atlas(es) that the MANE 104 determines do not correspond to the view(s) of interest. For example, a vuh_atlas_id syntax element in a vpcc_unit_header( ) syntax structure may be used to determine the atlas identifier with a vpcc_unit_payload( ) syntax element. The MANE 104 keeps the video-based point cloud compression (VPCC) units corresponding to the flagged atlases (e.g., atlases that the MANE 104 determined do not correspond to view(s) of interest) and discards the remaining VPCC units. The MANE 104 may apply the filtering to some or all of the components of the VPCC bitstream with any value of vuh_unit_type (e.g., geometry and atlas data, attribute type, and occupancy types, etc.). After filtering, the example MANE 104 transmits the filtered bitstream (e.g., including only atlases that correspond to view(s) of interest) to the example decoder 108.

In some examples, the MANE 104 of FIG. 1 may receive feedback data corresponding to a new field of view (e.g., via the example network 112). Because of temporal inter prediction in video streams, the MANE 104 may apply filtering to intra-random access point (IRAP) access units when the coded video stream includes intra-coded pictures. Intra-coded pictures may include a IRAP access unit that includes data related to an entire frame (e.g., does not include information related to views other than itself for inter prediction) followed both non-IRAP access units (e.g., which includes information related to views of previous access units). Because non-IRAP access units include information related to previous access units, filtering out atlases may cause the non-IRAP access units to reference atlas(es) that have been filtered out. Accordingly, in such intra-coded systems, the example MANE 104 may ensure that the filtered geometry, attribute, and occupancy video streams are conforming bitstreams that include complete coded video sequences (CVSes) starting with intra-coded pictures. In this manner, even if the views of interest and orientation change over time, neighboring views have been selected to accommodate the change with the same sequence (e.g., between IRAP access units). Additionally or alternatively, the example MANE 104 may only adjust the filtering process when a IRAP access unit is received. The example MANE 104 is further described below in conjunction with FIG. 3.

The example rendering system 106 of FIG. 1 includes the example decoder 108, the example display 110. In some examples, the example rendering system 106 includes part or all of the example MANE 104. The rendering system 106 may be implemented via a client system and encoding system 101 may be implemented via a server or source system. The example decoder 108 is hardware (e.g., a processor, a logic circuit, etc.,), software, and/or firmware that obtains the filtered bitstream from the example MANE 104 (e.g., via the example network 112) and decodes the filtered bitstream and/or renders view(s) of the filtered bitstream that may be displayed on the example display 110 by selecting decoded views that correspond to a viewport (e.g., using a subset of the decoded views that are closest to the viewport). In some examples, the decoder 108 obtains the bitstream via an interface (e.g., the interface 920 of FIG. 9). The example decoder 108 may demultiplex and/or parse the received bitstream to generate (e.g., extract) a coded atlas data bitstream and one or more atlas data hash SEI messages from the obtained bitstream data. After parsing the received bitstream, the example decoder 108 decodes the coded texture to generate decoded texture values, decodes the coded depth to generate decoded depth values, decodes the coded atlas data bitstream to generate a decoded atlas data bitstream, the depth atlases, and/or corresponding atlas data instances based on the encoding technique used by the encoder 102, etc. The example decoder 108 determines which views to use when rending a viewport on the example display 110 (e.g., typically a subset of the decoded views that are closest to the viewport) based on feedback data from the display 110 and/or other sensors on the rendering system 106. In some examples, there may be one or more sensors on the rendering system 106 that identifies a position and/or orientation of the display 110 and may provide such information (e.g., feedback data) to the decoder 108 so that the decoder 108 can determine which views to display on the display 110 to render a viewport (e.g., the views that correspond to the feedback data). In some examples, a user may determine provide the feedback data based on views of interest and/or a desired viewport from the user.

In some examples, the decoder 108 processes the SEI message(s), metadata, etc. corresponding to the atlas(es) of the filtered bitstream to determine the occupancy of the pixels corresponding to the atlas(es). For example, the decoder 108 may identify a fully occupied bit value to determine if all pixels in an atlas, and/or a patch of the atlas are occupied. If the example decoder 108 determines that the fully occupied bit value is set to a value indicative of a fully occupied status, the example decoder 108 determines that all the bits in the atlas and/or a patch are occupied. If the example decoder 108 determines that the fully occupied bit value is set to a value indicative of a not fully occupied status, or such a fully occupied bit value is not included, the example decoder 108 processes an occupied map which includes an occupied value for each pixel in a patch and/or atlas to determine which pixels of a view are occupied and which pixels are not occupied.

For a single atlas group (e.g., when a syntax element (num_groups_minus1) corresponding to the bitstream equals a value of '0'), the decoder 108 processes an array of flags (e.g., TargetAtlasFlag[ ], of length vps_atlas_count_minues1+1, an array of flags that the end user or system can specify which atlases should be decoded, so that the decoder operation can be described when not all atlases are to be decoded) indicating if each atlas is targeted for decoding to generate an output of an array of flags indicating if each view is targeted for rending. The example decoder 108 identifies the views in the atlases forwarded to be rendered based on their relevance to the target viewport (e.g., that have the TargetAltasFlag set to '1') that will contribute to the viewport's synthesis. Based on the foregoing description, the example decoder 108 may identify the views for a single atlas group using the example pseudocode (1) shown in Table 1 below.

TABLE 1

Pseudocode(1)

1) Output of this process is the total number or targeted atlases based on the flagged views of interest
numTargetAtlases = 0
for (i=0; i<= vps_atlas_count_minus1; i++)
  numTargetAtlases+ = TargetAtlasFlag[i]
2)   This resets the target view flags
for (v=0; v<= mvp_num_views_minus1; v++)
  TargetViewFlag [v] = 0

TABLE 1-continued

Pseudocode(1)

3)   This identifies the views in the atlases that will contribute to the viewport's synthesis
if (TargetAtlasFlag [a])
  for (v=0; v<= mvp_num_views_minus1; v++)
    if (masp_view_enabled_in_atlas_flag [a] [v])
      TargetViewFlag [v] = 1

For a multi atlas group (e.g., when a syntax element (num_groups_minus1) corresponding to the bitstream is greater than '0'), the decoder 108 processes (a) an array of flags (e.g., TargetAtlasFlag[ ], of length vps_atlas_count_minues1+1) indicating which atlases are targeted for decoding, (b) a camera parameters list from the syntax element miv_view_params list, (c) a target viewport position and orientation defined in a syntax element ViewportExtrinsics, etc. The decoder 108 generates an output of (a) an array of flags (e.g., sized numPassesX mvp_num_views_minues1+1) indicating if each view, v, is used during the synthesis in the pth pass (e.g., TargetViewFlag[p][v] for pass index p and source view v) and (b) the number of passes the synthesizer is involved in (e.g., syntax element numPasses). The example variables numPasses and TargetViewFlag [p][v] are derived (e.g., using the example MANE 104 and/or the example decoder 108 of FIG. 1) in conjunction with the below Table 3. Based on the foregoing description, the example decoder 108 may identify the views for a multi atlas group using the example pseudocode (2) shown in Table 2 below and the example pseudocode (3) shown in Table 3 below.

TABLE 2

Pseudocode(2)

1)   Output of this process is the total number or targeted atlases based on the flagged views of interest
numTargetGroups = 0
for (i=0; i<= msp_num_groups_minus1; i++) {
  if (TargetGroupFlag[i])
    TargetGroupIdxVector [numTargetGroups] = i
  numTargetGroups += TargetGroupFlag[i]
}
2)   This resets the target view flags
for (g=0; g < numTargetGroups; g++)
  for (v=0; v<= masp_num_views_minus1; v++)
    TargetGroupViewFlag [g] [v] = 0
3)   This identifies the views in the atlases that will contribute to the viewport's synthesis
for (g=0; g < numTargetGroups; g++)
  for (a=0; a <= vps_atlas_count_minus1; a++)
    if (masp_group_id [a]== TargetGroupIdxVector[g])
      for (v=0; v<= masp_num_views_minus1; v++)
        if (masp_view_enabled_in_atlas_flag [a] [v])
          TargetGroupViewFlag[g] [v] = 1

TABLE 3

Pseudocode(3)

numPasses = numTargetGroups
for (p = 0; p <= numPasses; p++) {
  for (v = 0; v <= masp_num_views_minus1; v++) {
    if(p==0)
      TargetViewFlag[p][v] = TargetGroupViewFlag TABLE 3-continued Pseudocode(3)

```
    [GroupIdOrdering[p]][v]
      else
        TargetViewFlag[p][v] = TargetViewFlag[p-1] [v] ||
      TargetGroupViewFlag [GroupIdOrdering[p]] [v]
      }
  }
```

In some examples, the network 112 of FIG. 1 is a system of interconnected systems exchanging data. In some examples, the network 112 may be implemented using any type of public or private network such as, but not limited to, the Internet, a telephone network, a local area network (LAN), a cable network, and/or a wireless network. In some examples, to enable communication via the network 112, the example encoding system 101, the example MANE 104, and/or the example rendering system 106 include communication interface(s) that enables a connection to an Ethernet, a digital subscriber line (DSL), a telephone line, a coaxial cable, and/or any wireless connection, etc.

FIG. 2 is a block diagram of an example implementation of the atlas data indicator 103 of FIG. 1. The example block diagram includes an example component interface 200, an example view/atlas encoding analyzer 202, an example signal indicator 204, and an example signal/syntax generator 206.

The example component interface 200 of FIG. 2 obtains information related to how views are to be encoded into atlases for a bitstream from the example encoder 102. For example, the component interface 200 obtains, receives, and/or accesses data from the example encoder 102 and the example view/atlas encoding analyzer 202 processes the data to determine how views are scheduled to be encoded in patches and/or atlases for a bitstream (e.g., which views are complete and/or fully included in a single atlas, which views may be partially included within different atlases, whether the pixels corresponding to views in patches and/or atlases are occupied, etc.). The example view/atlas encoding analyzer 202 may be a controller, a processor, a circuit, hardware, software, firmware, and/or any combination thereof.

The example signal indicator 204 of FIG. 2 signals information related to an atlas based on the information processed by the view/atlas encoding analyzer 202. For example, if the view/atlas encoding analyzer 202 determines that a view will be fully included in a particular atlas, the example signal indicator 204 may set a flag or value for the view to indicate the view is complete within the atlas. In some examples, if the view/atlas encoding analyzer 202 determines that patches corresponding to a view may be included in three atlases, the example signal indicator 204 indicates that the view will potentially be included in the three atlases by setting a value corresponding to the view and/or atlas to a first value (e.g., '1'). Additionally or alternatively, if the example view/atlas encoding analyzer 202 determines that all the pixels corresponding to a particular patch or atlas will be occupied, the example signal indicator 204 indicates that the corresponding patch and/or atlas is fully occupied by setting a full occupancy value and/or a full occupancy flag corresponding to the patch and/or atlas to a first value (e.g., '1'). If the example view/atlas encoding analyzer 202 determines that at least one of the pixels corresponding to a particular patch or atlas is not occupied, the example signal indicator 204 indicates that the individual values corresponding to pixels based on whether the individual pixels are occupied by setting the full occupancy value and/or full occupancy flag corresponding to the particular patch or atlas to a second value (e.g., '0') and generating a bit occupancy value and/or occupancy flag corresponding to the occupancy per pixel (e.g., '1' for occupied '0' for not occupied). The example signal indicator 204 may be a controller, a processor, a circuit, hardware, software, firmware, and/or any combination thereof.

The example signal/syntax generator 206 of FIG. 2 generates the syntax for the SEI message, metadata, etc. to indicate the flags (e.g., enabled flag, occupancy flag, and/or complete flag) generated by the signal indicator 204. For example, the below Table 4 illustrates an example syntax the example signal/syntax generator 206 may use for signaling view(s) that may be included in a particular atlas and whether the pixels in the atlas are fully occupied. Accordingly, the signal/syntax generator 206 may generate a signal based on the below syntax for respective atlases.

TABLE 4

Atlas Parameter Syntax

| | Descriptor |
|---|---|
| miv_atlas_sequence_params( vuh_atlas_id ) { | |
|   if( vuh_atlas_id == 0 ) | |
|     masp_omaf_v1_compatible_flag | u(1) |
|   masp_group_id | u(v) |
|   masp_fully_occupied_flag | u(1) |
|   masp_num_views_minus1 | u(16) |
|   for (v = 0; v<= masp_num_views_minus1; v++) { | |
|     masp_view_enabled_in_atlas_flag[ v ] | u(1) |
|     if(masp_view_enabled_in_atlas_flag[ v ]) | |
|       masp_view_complete_in_atlas_flag [ v ] | u(1) |
|   } | |
|   masp_auxiliary_atlas_flag | u(1) |
|   masp_depth_occ_map_threshold _flag | u(1) |
|   if(msp_geometry_scale_enabled_flag == 1 ) { | |
|     masp_geometry_frame_width_minus1 | u(v) |
|     masp_geometry_frame_height_minus1 | u(v) |
|   } | |
| } | |

In the above example of Table 4, u(n) corresponds to the number of n bytes needed for the corresponding syntax element. The syntax element masp_fully_occupied_flag set to a value of '1' may indicate that it is a requirement of bitstream conformance that all values of OccupancyValue [y][x] (e.g., the occupancy values for all pixels of a patch or atlas) be equal to 1 for the atlas identified by vuh_atlas_id for values of y in the range 0 to asps_frame_height−1 (e.g., where asps_frame_height is the vertical dimensions of the size of the atlas frame, signaled in the atlas sequence parameter set (asps)), and for values of x in the range 0 to asps_frame_width−1. The syntax element masp_fully_occupied_flag set to a value of '0' indicates no constraint and/or bitstream conformance requirement. The syntax element masp_num_views_minus1 specifies the number of views for which view enable information will be signaled. The syntax element masp_view_enabled_in_atlas_flag[vuh_atlas_id] [v] can be set to a value of '1' to indicate that for any atlas_tile_group_data_unit( ) (also referred to as atlas_tile( )) in any VPCC_AD referring to the MIV atlas sequence parameters (MASP), for all values of p in the range 0 to AtgduTotalNumberOfPatches−1 (e.g., where AtgduTotalNumberOfPatches is the number of patches in an atlas tile), inclusive, the value of pdu_view_id[p] (e.g., a syntax element indicating for each patch what view it is from) may be equal to v. The atlas_tile_group_data_unit( ) is a syntax structure including syntax elements for an atlas tile group. Video Point Cloud Coding (VPCC) (also referred to as Visual Volumetric Video-based Coding (V3C)) refers to the VPCC standard and AD refers to atlas data. MASP is a MIV-parameter set that includes syntax elements which apply to an entire MIC sequence (e.g., a sequence that begins with an TRAP). The syntax element masp_view_enabled_in_atlas_flag[v] set to a value of '0' may indicate that the value of pdu_view_id[p] shall not be equal to v. The element pdu_view_id patchIdx] specifies the view index associated with the patchIdx-th patch. The number of bits used to represent pdu_view_id[patchIdx] is equal to Ceil (Log2(AspsMaxProjections[vuh_atlas_id])). AspsMaxProjections[vuh_atlas_id] represents for the atlas with ID vuh_atlas_id, the maximum number of views (projections) for which view/camera parameters are signaled. The number of bits required to represent the view ID is based on this. For example, if there are 8 views, the view id can be represented with 3 bits. The value of the element pdu_view_id[patchIdx] can be in the range of 0 to mvp_num_views_minus1, inclusive. For any v in 0 mvp_num_views_minus1, if the element masp_view_enabled_in_atlas_flag[v] is equal to 0, the value of pdu_view_id [patchIdx] will not equal v.

When the syntax element masp_view_enabled_in_atlas_flag[v] is not present, the value of masp_view_enabled_in_atlas_flag[vuh_atlas_id][v] is inferred to be equal to '1'. In this manner, the syntax element masp_view_enabled_in_atlas_flag[v] represents the enabled flags corresponding to whether at least one patch of a view may be included in an atlas. The syntax element masp_view_complete_in_atlas_flag[vuh_atlas_id][v] corresponds to the complete map and may be set to a value of '1' to indicate that all values of ReconstructedDepth[v] output by the reconstruction of source view process for the vuh_atlas_id-th are valid values, thereby indicating whether a view is completely included in the atlas. The syntax element masp_depth_occ_threshold_flag may be set to a value of '1' to indicate that the pdu_depth_occ_map_threshold syntax element is present in the patch_data_unit( )) syntax structure. The example syntax element masp_depth_occ_threshold_flag may be set to a value of '0' to indicate that the pdu_depth_occ_map_threshold syntax element is not present in the patch_data_unit( )) syntax structure. When syntax element masp_depth_occ_threshold_flag is not present, the value of the syntax element masp_depth_occ_threshold_flag is inferred to be a value of '0'. When masp_fully_occupied_flag is set to a value of '1', the value of masp_depth_occ_threshold_flag is set to a value of '0'. Although the example signal/syntax generator 206 may use the above syntax of Table 4 to signal views included in atlases and/or occupancy of pixels, the example signal/syntax generator 206 may signal the views and/or occupancy in any type of message in any format. The example signal/syntax generator 206 may be a controller, a processor, a circuit, hardware, software, firmware, and/or any combination thereof.

Figure 3:
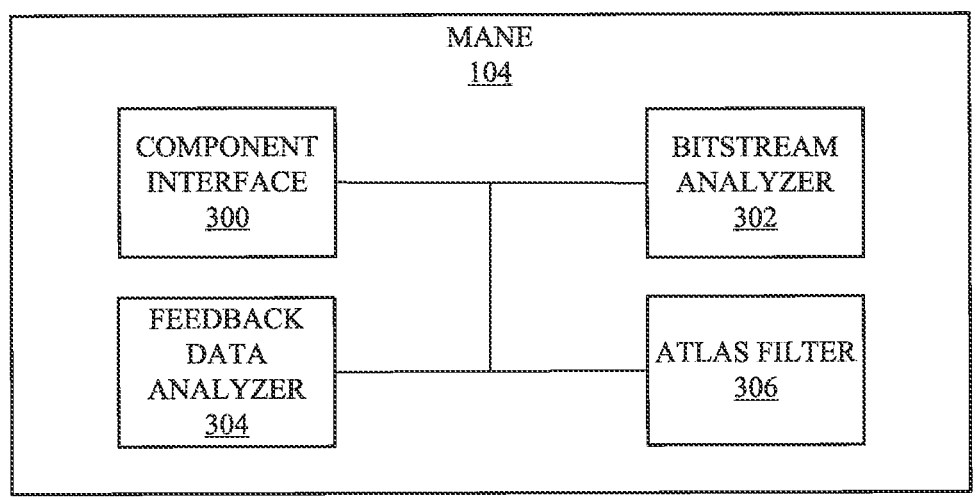
FIG. 3 is a block diagram of an example implementation of an example media aware network element included in the environment of FIG. 1.

FIG. 3 is a block diagram of an example implementation of the MANE 104 of FIG. 1. The example block diagram includes an example component interface 300, an example bitstream analyzer 302, an example feedback analyzer 304, an example atlas filter 306, and an example atlas selector 308.

The example component interface 300 of FIG. 3 interfaces with other components of the MANE 104 (such as the components of FIG. 8) and/or other comments of the example rendering system 106 (e.g., when implemented in the rendering system 106). For example, the example component interface 300 may obtain bitstream data and/or feedback data from the encoding system 101 and/or the rendering system 106 (e.g., via the example interface 820 and/or network 112 and/or directly via the bus 818/918). Additionally, the example component interface 300 can transmit filtered data to the example rendering system 106 (e.g., via the interface 820 when not implemented in the rendering system 106 or via the bus 818/918 when implemented in the rendering system 106).

The example bitstream analyzer 302 of FIG. 3 analyzes the SEI messages, metadata, etc. that correspond to the atlases of the bitstream to be able to determine which views are incorporated (e.g., partially or fully) in the respective atlases. For example, the bitstream analyzer 302 can process a message corresponding to the example syntax of the above Table 4 to identify which views are fully or partially included in the respective atlases of the bitstream. The example bitstream analyzer 302 may be a controller, a processor, a circuit, hardware, software, firmware, and/or any combination thereof.

The example feedback data analyzer 304 of FIG. 3 analyzes the feedback data from the example rendering system 106. As described above in conjunction with FIG. 1, the feedback data corresponds to the views of the multidimensional video are views of interest (e.g., views that may used in the rendering process to render a viewport for display on the example display 110 and/or views selected by a user). In some examples, the feedback data analyzer 304 obtains the view of interest. In some examples, the feedback data analyzer 304 determines the views of interest based on the feedback data. For example, the feedback data analyzer 304 may obtain the desired viewport position and orientation (e.g., from the rendering system 106) and the feedback data analyzer 304 may determine the position of the views using view camera extrinsic parameters, for example. In some examples, the feedback data analyzer 304 may select a subset of the available views that are closest to the position and/or orientation of the desired viewpoint. The feedback data analyzer 304 may determine the closest view position by calculating a three dimensional distance and the angular deviation between the center of the view camera and the center of the desired viewport. Once the two centers are selected, the feedback data analyzer 304 selects the view with the smallest distances or, in some examples, a threshold number of views with the smallest distances and/or any view(s) with a distance less than a threshold, etc. In some examples, the feedback data analyzer 304 adjusts the threshold(s) based on contextual data, as further described above in conjunction with FIG. 1. In some examples, the feedback data analyzer 304 may expand the number of views of interest when IRAP access units are used, as described above in conjunction with FIG. 1.

As described above, the example feedback data analyzer 304 of FIG. 3 may determine the distances between the source views (e.g., enabled in the flagged or targeted groups) and the target viewport using camera parameters and the target viewpoint position and orientation. The feedback data analyzer 304 orders the groups according to a vector element (GroupIdOrdering[ ], of length equal to numTargetGroups) such that the target group of closest views to the target viewport is listed first and the farthest ordered last. Example pseudocode (4) to perform such processing is shown in Table 5 below.

TABLE 5

Pseudocode(4)

```
for (g=0; g < numTargetGroups; g++) {
    index = 0
    for (v=0; v<= masp_num_views_minus1; v++)
        if (TargetGroupViewFlag [g] [v])
            ViewDistance [index++]
    =ComputeDistance(camera_extrinsics(v), ViewportExtrinsics)
        TargetGroupDistance [g] = min (ViewDistance)
}
GroupIdOrdering = Sort (TargetGroupDistance)
```

In some examples, the feedback data analyzer 304 of FIG. 3 may adjust the criteria (e.g., thresholds) corresponding to how many views of interest to select based on contextual data. For example, the feedback data analyzer 304 may process and/or store previous feedback data to determine how much the feedback data is updated (e.g., corresponding to more movement and more adjustments in which views are views of interest). When the feedback data is updated frequently (e.g., based on a threshold), the example feedback data analyzer 304 may adjust the criteria to increase the number of view(s) of interest because it is more likely that the more views near the target viewport will become of interest due to the rapid change in the position and/or orientation data. In some examples, the feedback data analyzer 304 may decrease the number of view(s) of interest when the feedback data is more consistent and changes less with respect to time. Additionally or alternatively, the feedback data analyzer 304 may obtain data related to how the immersive video will be used and adjust the views of interest criteria based on how the immersive video will be used. For example, an immersive video that corresponds to a video game may correspond to more views of interest as there is a higher probability that the user will adjust the position and/or orientation of the display more frequently for a video game as opposed to a video. The example feedback data analyzer 304 may be a controller, a processor, a circuit, hardware, software, firmware, and/or any combination thereof.

The example atlas filter 306 of FIG. 3 filters out atlases that do not corresponds to views of interest (e.g., atlases that have not been identified as fully including and/or potentially including patch(es) and/or data related to the view(s) of interest). For example, after the atlases corresponding to the views of interest are flagged, targeted, identified, determined, etc., the example atlas filter 306 removes the atlases and/or any corresponding information from the bitstream that do not corresponds to view(s) of interest. The example atlas filter 306 outputs the filtered bitstream to the example component interface 300 to transmit to the decoder 108 of FIG. 1.

While an example manner of implementing the atlas data indicator 103, the example MANE 104, and/or the rendering system 106 of FIG. 1 is illustrated in FIGS. 1-3, one or more of the elements, processes and/or devices illustrated in FIGS. 1-3 may be combined, divided, re-arranged, omitted, eliminated and/or implemented in any other way. Further, the example decoder 108, the example display 110, the example component interface 200, the example view/atlas encoding analyzer 202, the example signal indicator 204, the example signal/syntax generator 206, the example component interface 300, the example bitstream analyzer 302, the example feedback data analyzer 304, the example atlas filter 306, and/or, more generally, the example atlas data indicator 103 of FIG. 2 and/or the example MANE 104 of FIG. 3 may be implemented by hardware, software, firmware and/or any combination of hardware, software and/or firmware. Thus, for example, any of the example decoder 108, the example display 110, the example component interface 200, the example view/atlas encoding analyzer 202, the example signal indicator 204, the example signal/syntax generator 206, the example component interface 300, the example bitstream analyzer 302, the example feedback data analyzer 304, the example atlas filter 306, and/or, more generally, the example atlas data indicator 103 of FIG. 2 and/or the example MANE 104 of FIG. 3 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example decoder 108, the example display 110, the example component interface 200, the example view/atlas encoding analyzer 202, the example signal indicator 204, the example signal/syntax generator 206, the example component interface 300, the example bitstream analyzer 302, the example feedback data analyzer 304, the example atlas filter 306, and/or, more generally, the example atlas data indicator 103 of FIG. 2 and/or the example MANE 104 of FIG. 3 is/are hereby expressly defined to include a non-transitory computer readable storage device or storage disk such as a memory, a digital versatile disk (DVD), a compact disk (CD), a Blu-ray disk, etc. including the software and/or firmware. Further still, the example encoding system 101, the MANE 104, and/or the example rendering system 106 may include one or more elements, processes and/or devices in addition to, or instead of, those illustrated in FIG. 1, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
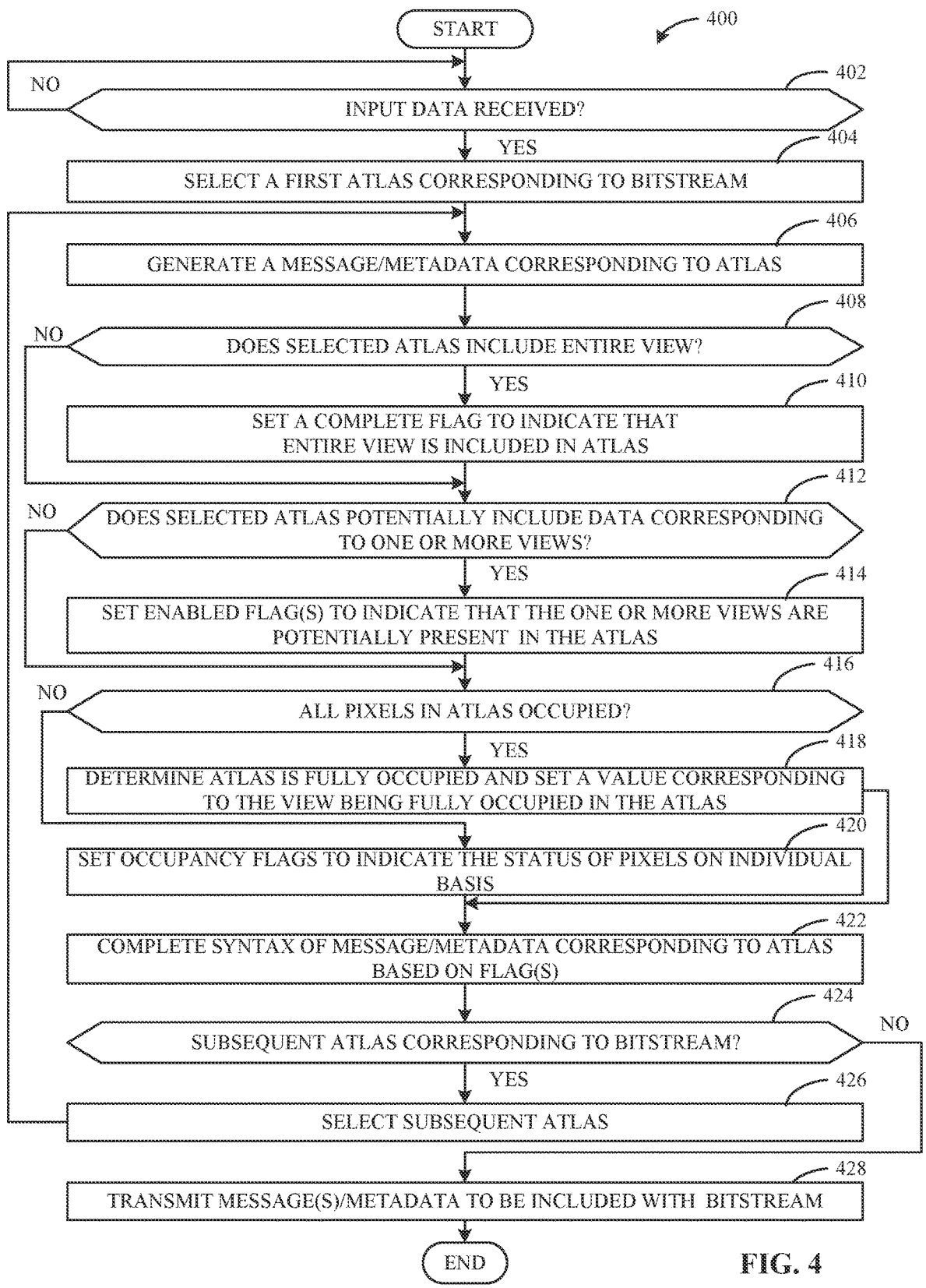
FIG. 4 is a flowchart representative of example machine readable instruction which may be executed to implement the atlas data indicator of FIG. 2.
Figure 5:
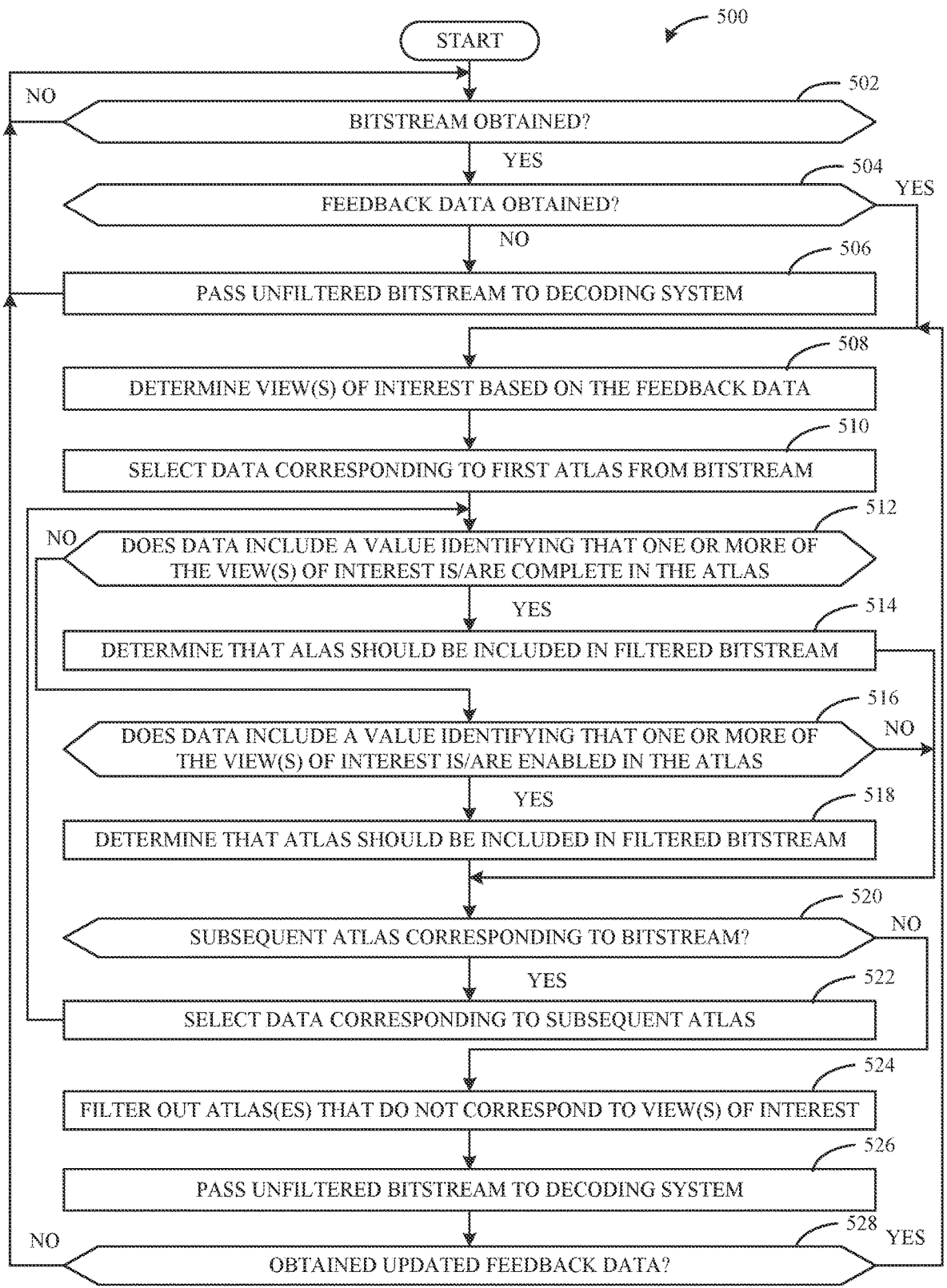
FIG. 5 is a flowchart representative of example machine readable instruction which may be executed to implement the media aware network element of FIG. 3.
Figure 6:
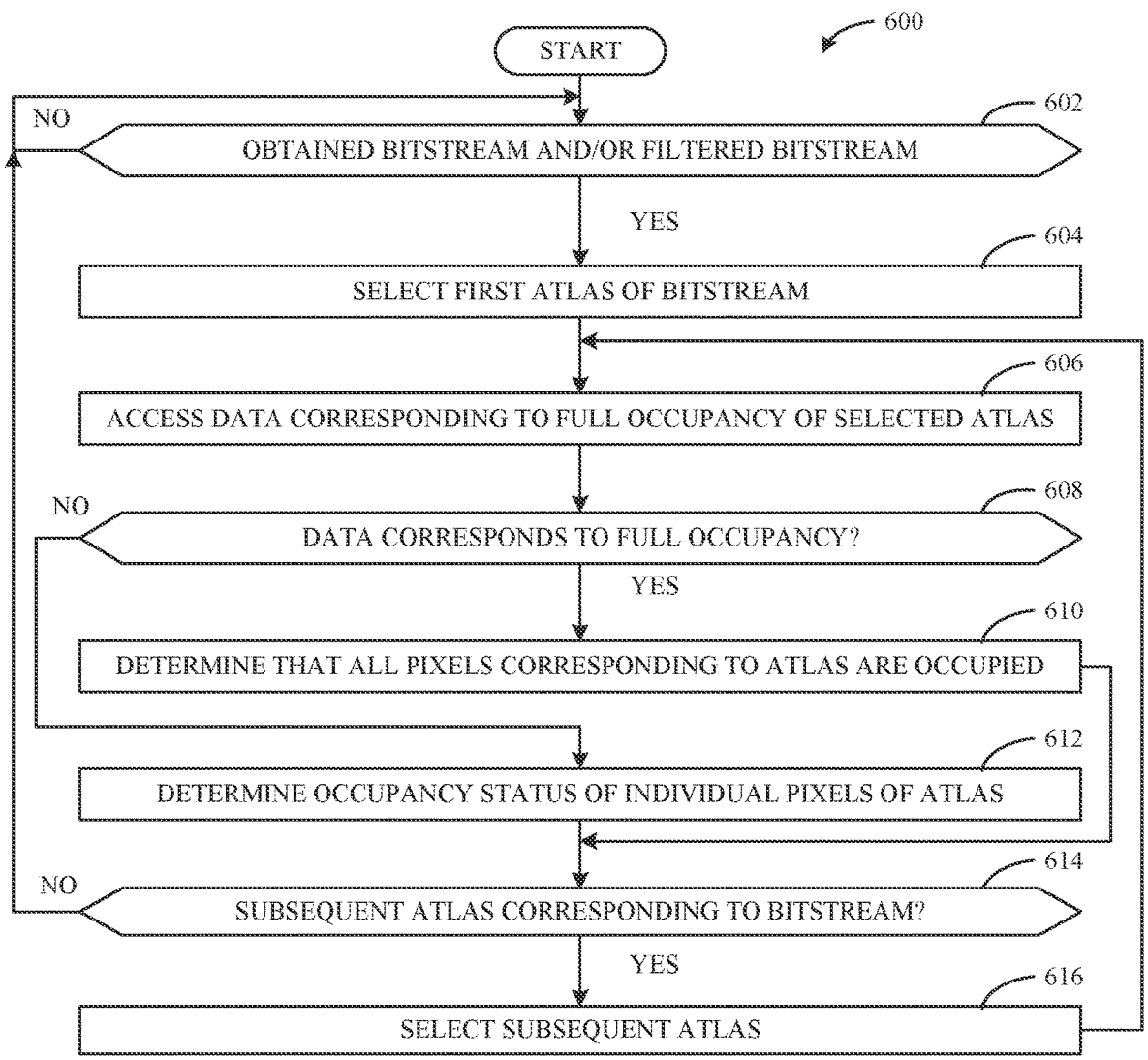
FIG. 6 is a flowchart representative of example machine readable instruction which may be executed to implement an example decoder included in the environment of FIG. 1.

Flowcharts representative of example hardware logic, machine readable instructions, hardware implemented state machines, and/or any combination thereof for implementing the atlas data indicator 103, the example MANE 104, and/or the example decoder 108 of FIGS. 1-3 are shown in FIGS. 4-6. The machine readable instructions may be one or more executable programs or portion(s) of an executable program for execution by a computer processor such as the processor 712, 812, 912 shown in the example processor platform 700, 800, 900 discussed below in connection with FIGS. 7-9. The program may be embodied in software stored on a non-transitory computer readable storage medium such as a CD-ROM, a floppy disk, a hard drive, a DVD, a Blu-ray disk, or a memory associated with the processor 712, 812, 912 but the entire program and/or parts thereof could alternatively be executed by a device other than the processor 712, 812, 912 and/or embodied in firmware or dedicated hardware. Further, although the example program is described with reference to the flowchart illustrated in FIGS. 7-9, many other methods of implementing the example atlas data indicator 103, the example MANE 104 and/or the decoder 108 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 2 and 3 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 4 is a flowchart representative of example machine readable instructions 400 which may be executed to implement the example atlas data indicator 103 of FIG. 2 to generate syntax to signal enabled and/or complete views per atlas and/or occupancy in immersive video. Although the instructions 400 are described in conjunction with the example atlas data indicator 103 of FIG. 2, the instructions 400 may be described in conjunction with any type of encoding system.

At block 402, the example component interface 200 determines if input data has been received. The input data may be data corresponding to how immersive video is to be or was encoded into patches/atlases to generate a bitstream. If the example component interface 200 determines that input data has not been received (block 402: NO), control returns to block 402 until input data is received. If the example component interface 200 determines that the input data has been received (block 402: YES), the example view/atlas encoding analyzer 202 selects a first atlas corresponding to bitstream (block 404).

At block 406, the example signal/syntax generator 206 generates a message (e.g., an SEI message, metadata, etc.) to correspond to the selected atlas. For example, the signal/syntax generator 206 starts the framework for the message/metadata that corresponds to the selected atlas that will be included in the bitstream. At block 408, the example view/atlas encoding analyzer 202 determines if the selected atlas includes an entire view. For example, the view/atlas encoding analyzer 202 may determine that the view will be completely included in the atlas when all values of an element ReconstructedDepth[v] output by the reconstruction of source view process for the atlas identified by the identifier vuh_atlas_id (e.g., from the encoder 102) are valid values. If the example view/atlas encoding analyzer 202 determines that the selected atlas does not include an entire view (block 408: NO), control continues to block 412. If the example view/atlas encoding analyzer 202 determines that the selected atlas includes an entire view (block 408: YES), the example signal indicator 204 sets a complete flag (e.g., set a value corresponding to the view) to indicate that the entire view is included in the selected atlas (block 410).

At block 412, the example view/atlas encoding analyzer 202 determines if the selected atlas potentially includes data corresponding to one or more views. For example, when the encoder 102 encodes the views into the atlases, the encoder 102 selects one or more atlases that the views may be included in and the encoder 102 sends the view/atlas information to the example view/atlas encoding analyzer 202. If the example view/atlas encoding analyzer 202 determines that the selected atlas does not potentially include data corresponding to one or more views (block 412: NO), control continues to block 416. If the example view/atlas encoding analyzer 202 determines that the selected atlas potentially includes data corresponding to one or more views (block 412: YES), the example signal indicator 204 sets enable flags for the one or more views as potentially being present (e.g., as being enabled) in the selected atlas (block 414).

At block 416, the example view/atlas encoding analyzer 202 determines if all pixels corresponding to the atlas (e.g., the data values included in the atlas that corresponding to the pixels) are occupied. Although the example flowchart is described in conjunction with fully occupied atlases, the occupancy of the pixels could be determined based on patches and/or other groups of pixels, as further described above. If the example view/atlas encoding analyzer 202 determines that all of the pixels corresponding to the atlas are occupied (block 416: YES), the example signal indicator 204 determines that the atlas is fully occupied and sets a flag or value corresponding to the atlas to a first full occupancy value and/or full occupancy flag that indicates the view as being fully occupied in the atlas (block 418). If the example view/atlas encoding analyzer 202 determines that not all of the pixels corresponding to the atlas are occupied (block 416: NO), the example signal indicator 204 sets occupancy flags or occupancy values the occupancy status of the individual pixels represented in the atlas (block 420).

At block 422, the example signal/syntax generator 206 completes the syntax of the message/metadata corresponding to the atlas based on the flag(s). For example, the signal/syntax generator 206 may generate a message/metadata corresponding to the atlas using the above example syntax of Table 4. At block 424, the example view/atlas encoding analyzer 202 determines if there is a subsequent atlas corresponding to the bitstream for processing. If the example view/atlas encoding analyzer 202 determines that there is a subsequent atlas (block 424: YES), the example view/atlas encoding analyzer 202 selects the subsequent atlas (block 426) and control returns to block 406. If the example view/atlas encoding analyzer 202 determines that there is not a subsequent atlas (block 424: NO), the example component interface 200 transmits the message(s) and/or metadata (e.g., to the encoder 102) to be included with the bitstream. In this manner, the encoding system 101 can transmit the bitstream with the message(s) and/or metadata to the example MANE 104 via the network 112.

FIG. 5 is a flowchart representative of example machine readable instructions 500 which may be executed to implement the example MANE 104 to filter the bitstream based on feedback data. Although the instructions 500 are described in conjunction with the example MANE 104 of FIG. 1, the instructions 500 may be described in conjunction with any type of filtering system.

At block 502, the example component interface 300 determines if a bitstream has been obtained. For example, the component interface 300 may access other components of the MANE 104 (e.g., radio architecture, the example interface 820, etc.) to determine whether a bitstream has been obtained. If the example component interface 300 determines that a bitstream has not been obtained (block 502: NO), control returns to block 502 until a bitstream is obtained. If the example component interface 300 determines that a bitstream has been obtained (block 502: YES), the example component interface 300 determines if feedback data has been obtained (block 504). As described above, the feedback data is data from the example rendering system 106. For example, the feedback data may be viewport information from the display 110 and/or another sensor of the rendering system 106.

If the example component interface 300 determines that feedback data has not been obtained (block 506: NO), the example component interface 300 passes the obtained bitstream to the example rendering system 106 without filtering the bitstream (block 506) and control returns to block 502. If the example component interface 300 determines that feedback data has been obtained (block 506: YES), the example feedback analyzer 304 determines the view(s) of interest based on the feedback data (block 508). For example, the feedback analyzer 304 may extract the views of interest from the feedback data and/or may determine the views of interest based on a desired viewport position and orientation, view camera extrinsic parameters, contextual data, temporal inter prediction data, etc., as described above in conjunction with FIG. 3.

At block 510, the example bitstream analyzer 302 selects data (e.g., SEI messages, metadata, etc.) corresponding to a first atlas from the bitstream. At block 512, the example bitstream analyzer 302 determines if the data includes a value identifying that one or more of the view(s) of interest is/are complete (e.g., fully included) in the corresponding atlas (e.g., by analyzing the syntax of the data) based on the complete flag and/or value included in the syntax of the data. If the example bitstream analyzer 302 determines that the data includes a value identifying that one or more of the view(s) of interest is/are complete in the corresponding atlas (block 512: YES), the example bitstream analyzer 302 determines that the atlas should be included in the filtered bitstream (block 514).

If the example bitstream analyzer 302 determines that the data does not include a value identifying that one or more of the view(s) of interest is/are complete in the corresponding atlas (block 512: NO), the example bitstream analyzer 302 determines if the data includes a value identifying that one or more of the view(s) of interest is/are enabled (e.g., may partially be included in) the atlas (block 516) (e.g., by analyzing the enable flag(s) in the syntax of the data). If the example bitstream analyzer 302 determines that the data includes a value identifying that one or more of the view(s) of interest is/are not enabled in the atlas (block 516: NO), control continues to block 520. If the example bitstream analyzer 302 determines that the data includes a value identifying that one or more of the view(s) of interest is/are enabled in the atlas (block 516: YES), the example bitstream analyzer 302 determines that the atlas should be included in the filtered bitstream (block 518).

At block 520, the example bitstream analyzer 302 determine if there is a subsequent atlas corresponding to the bitstream is to be processed. If the example bitstream analyzer 302 determines that a subsequent atlas corresponding to the bitstream is to be processed (block 520: YES), the example bitstream analyzer 302 selects the data corresponding to the subsequent alas (block 522) and control returns to block 512. If the example bitstream analyzer 302 determines that there is no subsequent atlas corresponding to the bitstream to be processed (block 520: NO), the example atlas filter 306 filters out atlas(es) that do not correspond to view(s) of interest (block 524). At block 526, the example component interface 300 passes (e.g., transmits) the filtered bitstream to the example rendering system 106 of FIG. 1 (e.g., via the network 112 using the interface 820 of FIG. 8 or via a bus when the MANE 104 is implemented in the rendering system 106).

At block 528, the example component interface 300 determines if updated feedback data has been obtained (e.g., received). If the example component interface 300 determines that updated feedback data has been obtained (block 528: YES), control returns to block 508. If the example component interface 300 determines that updated feedback data has not been obtained (block 528: NO), control returns to block 502.

FIG. 6 is a flowchart representative of example machine readable instructions 600 which may be executed to implement the example decoder 108 to process a bitstream to identify fully occupied atlases. Although the instructions 600 are described in conjunction with the example decoder 108 of FIG. 1, the instructions 600 may be described in conjunction with any type of rendering system. Although the example of FIG. 6 is described in conjunction with fully occupied atlases, the instruction 600 of FIG. 6 may be described in conjunction with fully occupied patches and/or fully occupied groups of pixel data.

At block 602, the example decoder 108 determines if a bitstream or a filtered bitstream has been obtained. For example, the example decoder 108 may access other components of the rendering system 106 (e.g., radio architecture, the example interface 920, etc.) to determine whether a bitstream has been obtained. If the example decoder 108 determines that a bitstream/filtered bitstream has not been obtained (block 602: NO), the example decoder 108 selects data (e.g., SEI messages, metadata, etc.) corresponding to a first atlas from the bitstream (block 604).

At block 606, the example decoder 108 accesses the data corresponding to the occupancy of the selected atlas. For example, the example decoder 108 may process the message, metadata, etc. that corresponds to the selected atlas to identify a syntax element corresponding to the occupancy of the selected atlas. At block 608, the example decoder 108 determines if the data correspond to full occupied. For example, the example decoder 108 processes the syntax to identify a syntax element that corresponds to full occupancy and determines if the full occupancy value or full occupancy flag of the syntax element corresponds to full occupancy or not full occupancy.

If the example decoder 108 determines that the data corresponds to full occupancy (block 608: YES), the example decoder 108 determines that all pixels corresponding to the selected atlas are occupied (block 610). If the example decoder 108 determines that the data does not correspond to full occupancy (block 608: NO), the example decoder 108 determines the occupancy of each pixel on a pixel by pixel basis based on an occupancy array or map in the data.

At block 614, the example decoder 108 determine if there is a subsequent atlas corresponding to the bitstream is to be processed. If the example decoder 108 determines that a subsequent atlas corresponding to the bitstream is to be processed (block 614: YES), the example decoder 108 selects the data corresponding to the subsequent alas (block 616) and control returns to block 606. If the example decoder 108 determines that there is no subsequent atlas corresponding to the bitstream to be processed (block 614: NO), control returns to block 602.

Figure 7:
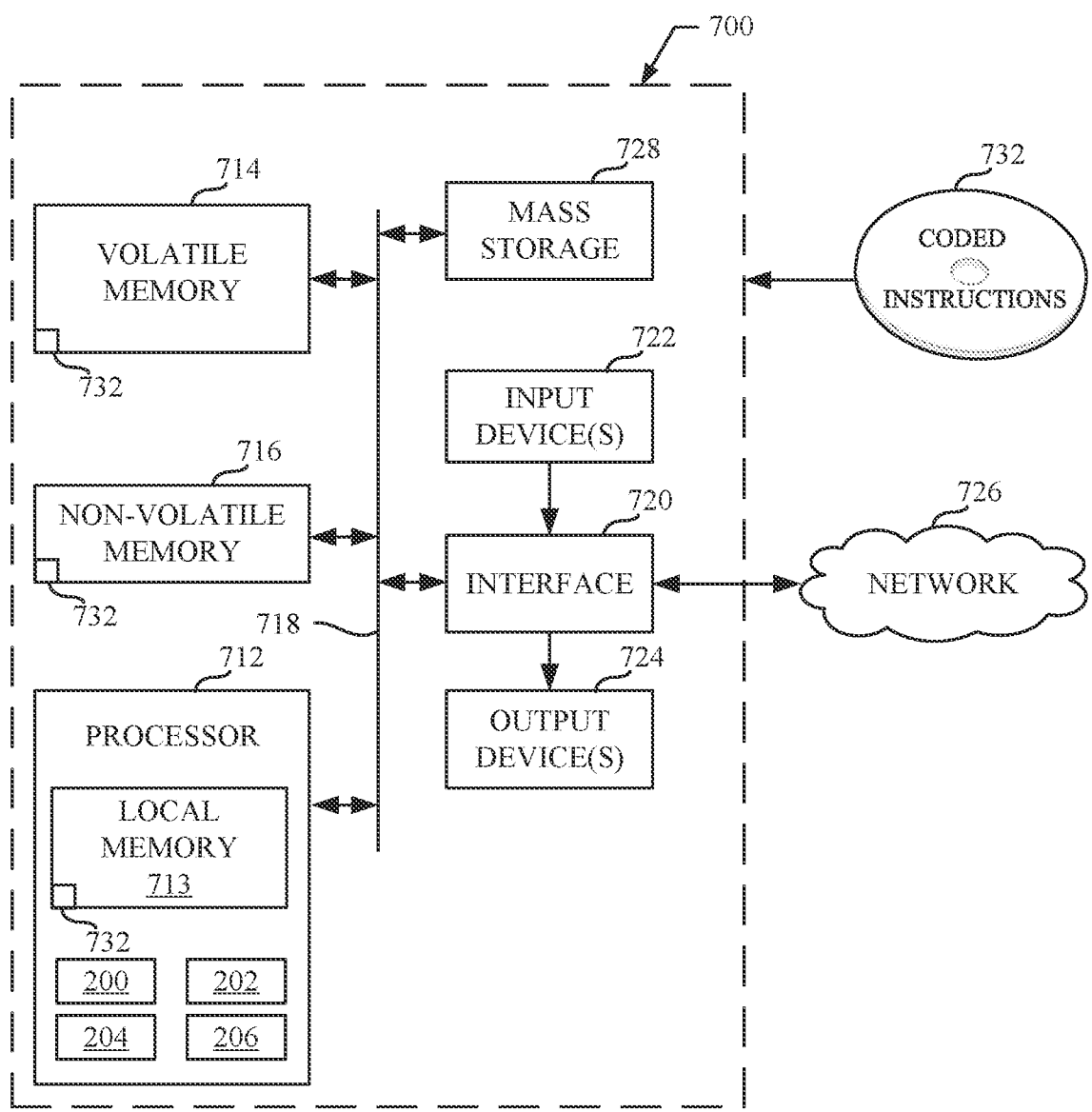
FIG. 7 is a block diagram of an example processing platform structured to execute the instructions of FIG. 4 to implement the atlas data indicator of FIGS. 1 and/or 2.

FIG. 7 is a block diagram of an example processor platform 700 structured to execute the instructions of FIG. 4 to implement the atlas data indicator 103 of FIGS. 1 and 2. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example component interface 200, the example view/atlas encoding analyzer 202, the example signal indicator 204, and the example signal/syntax generator 206 of FIG. 2.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives.

The machine executable instructions 732 of FIG. 4 may be stored in the mass storage device 728, in the volatile memory 714, in the non-volatile memory 716, and/or on a removable non-transitory computer readable storage medium such as a CD or DVD.

Figure 8:
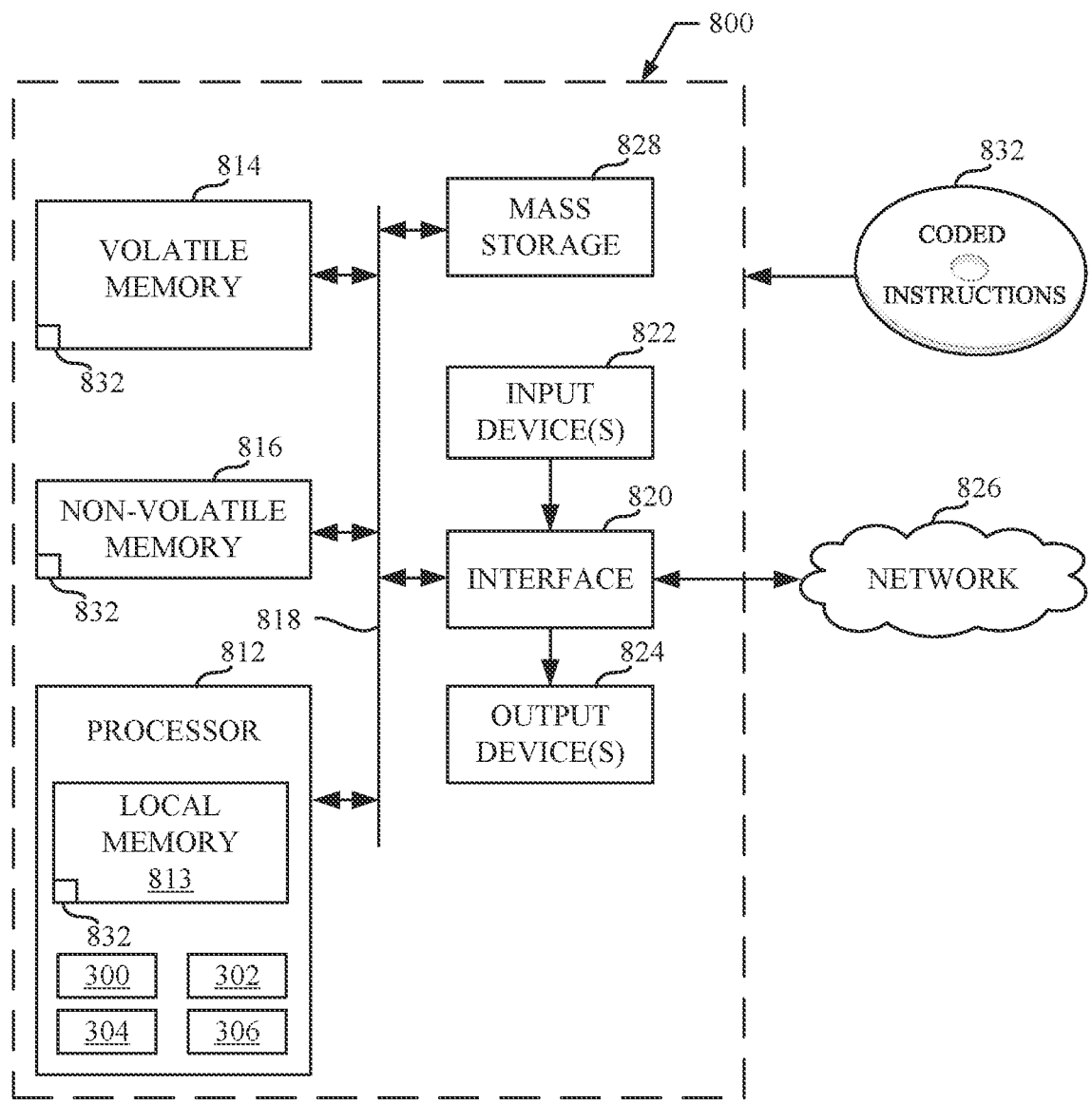
FIG. 8 is a block diagram of an example processing platform structured to execute the instructions of FIG. 5 to implement the media aware network element of FIGS. 1 and/or 3.

FIG. 8 is a block diagram of an example processor platform 800 structured to execute the instructions of FIG. 5 to implement the MANE 104 of FIG. 1. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example component interface 300, the example bitstream analyzer 302, the example feedback data analyzer 304, and the example atlas filter 306 of FIG. 3.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

The machine executable instructions 832 of FIG. 5 may be stored in the mass storage device 828, in the volatile memory 814, in the non-volatile memory 816, and/or on a removable non-transitory computer readable storage medium such as a CD or DVD.

Figure 9:
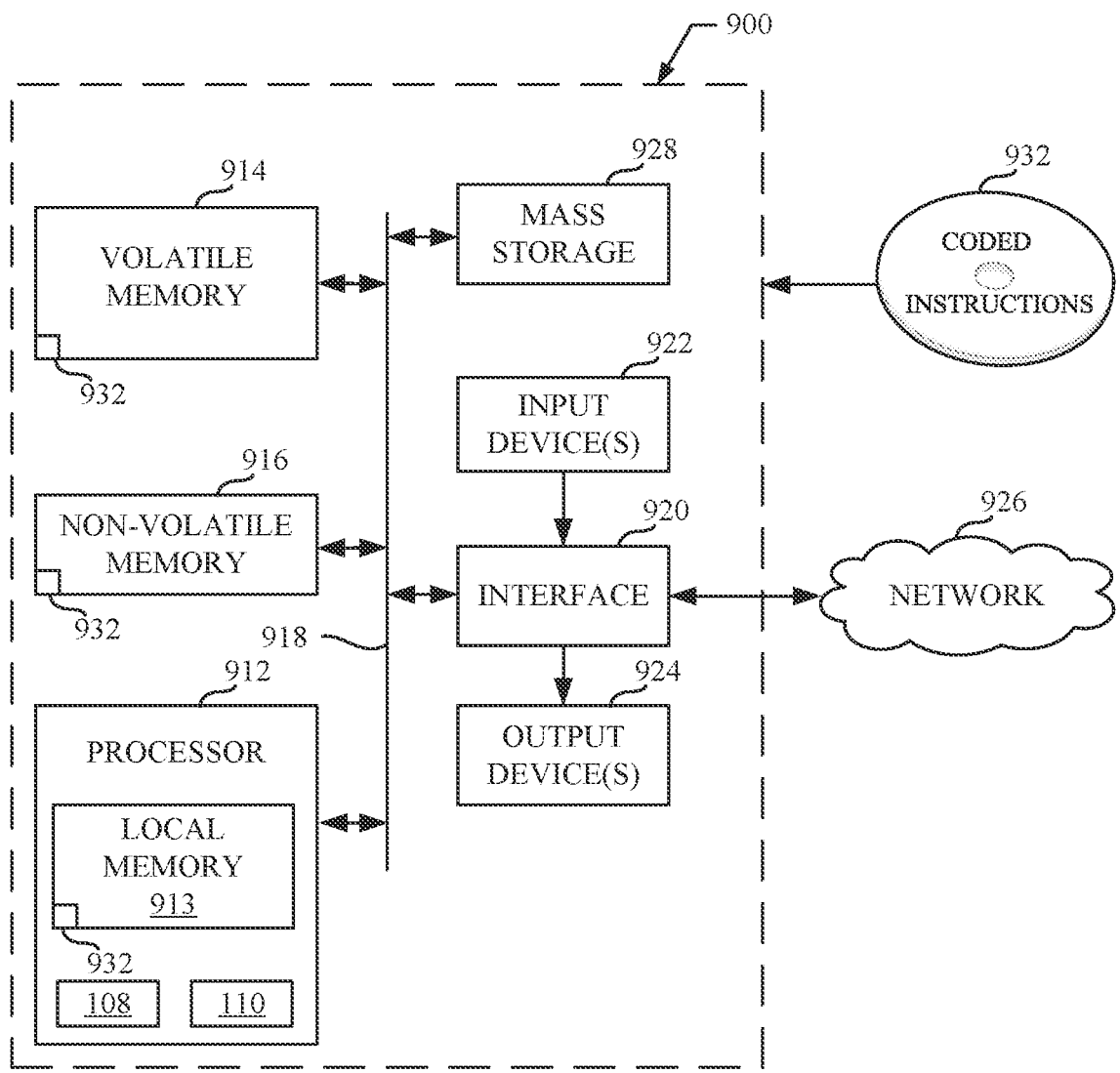
FIG. 9 is a block diagram of an example processing platform structured to execute the instructions of FIG. 6 to implement the decoder of FIG. 1.

FIG. 9 is a block diagram of an example processor platform 900 structured to execute the instructions of FIG. 3 to implement the rendering system 106 of FIG. 1. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example decoder 108 and the example display 110 of FIG. 1.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

The machine executable instructions 932 of FIG. 6 may be stored in the mass storage device 928, in the volatile memory 914, in the non-volatile memory 916, and/or on a removable non-transitory computer readable storage medium such as a CD or DVD.

Example methods, apparatus, systems, and articles of manufacture to sample enabled views per atlas in immersive video are disclosed herein. Further examples and combinations thereof include the following: Example 1 includes an apparatus comprising an interface to obtain a bitstream corresponding to an immersive video, the bitstream including one or more atlases corresponding to one or more views, a bitstream analyzer to determine that metadata corresponding to an atlas of the bitstream identifies that at least part of a view of interest corresponds to the atlas, the metadata included in the bitstream, and a filter to generate a filtered bitstream by removing atlases that do not identify at least part of the view of interest from the bitstream, the interface to provide the filtered bitstream to be processed to output the immersive video.

Example 2 includes the apparatus of example 1, further including a feedback data analyzer to determine the view of interest based on feedback data.

Example 3 includes the apparatus of example 2, wherein the feedback data includes at least one of position data or orientation data corresponding to a target viewport to be rendered by a decoder.

Example 4 includes the apparatus of example 2, wherein the feedback data includes camera extrinsic parameters.

Example 5 includes the apparatus of example 1, wherein the bitstream analyzer is to determine that the atlas includes the view of interest based on a value of a syntax element of the metadata.

Example 6 includes the apparatus of example 1, wherein the bitstream analyzer is to determine whether the view of interest is at least one of fully included in the atlas or partially included in the atlas based on the metadata.

Example 7 includes the apparatus of example 1, wherein the interface is to obtain the bitstream from an encoder via a first network communication and transmit the filtered bitstream to a decoder via a second network communication.

Example 8 includes the apparatus of example 1, wherein the interface is to obtain the bitstream from an encoder via a first network communication and transmit the filtered bitstream to a decoder via a bus.

Example 9 includes the apparatus of example 1, wherein the immersive video corresponds to a plurality of views per frame.

Example 10 includes a non-transitory computer readable storage medium comprising instructions which, when executed, cause one or more processors to at least obtain a bitstream corresponding to an immersive video, the bitstream including one or more atlases corresponding to one or more views, determine that a metadata corresponding to an atlas of the bitstream identifies that at least part of a view of interest corresponds to the atlas, the metadata included in the bitstream, generate a filtered bitstream by removing atlases that do not identify at least part of the view of interest from the bitstream, and provide the filtered bitstream to be processed to output the immersive video.

Example 11 includes the non-transitory computer readable storage medium of example 10, wherein the instructions cause the one or more processors to determine the view of interest based on feedback data.

Example 12 includes the non-transitory computer readable storage medium of example 11, wherein the feedback data includes at least one of position data or orientation data corresponding to a target viewport to be rendered by a decoder.

Example 13 includes the non-transitory computer readable storage medium of example 11, wherein the feedback data includes camera extrinsic parameters.

Example 14 includes the non-transitory computer readable storage medium of example 10, wherein the instructions cause the one or more processors to determine that the atlas includes the view of interest based on a value of a syntax element of the metadata.

Example 15 includes the non-transitory computer readable storage medium of example 10, wherein the instructions cause the one or more processors to determine whether the view of interest is at least one of fully included in the atlas or partially included in the atlas based on the metadata.

Example 16 includes the non-transitory computer readable storage medium of example 10, wherein the instructions cause the one or more processors to obtain the bitstream from an encoder via a first network communication and transmit the filtered bitstream to a decoder via a second network communication.

Example 17 includes the non-transitory computer readable storage medium of example 10, wherein the instructions cause the one or more processors to obtain the bitstream from an encoder via a first network communication and transmit the filtered bitstream to a decoder via a bus.

Example 18 includes the non-transitory computer readable storage medium of example 10, wherein the immersive video corresponds to a plurality of views per frame.

Example 19 includes an apparatus comprising means for obtaining a bitstream corresponding to an immersive video, the bitstream including one or more atlases corresponding to one or more views, means for determining that a metadata corresponding to an atlas of the bitstream identifies that at least part of a view of interest corresponds to the atlas, the metadata included in the bitstream, and means for generating a filtered bitstream by removing atlases that do not identify at least part of the view of interest from the bitstream, the means for obtaining to provide the filtered bitstream to be processed to output the immersive video.

Example 20 includes the apparatus of example 19, further including second means for determining the view of interest based on feedback data.

Example 21 includes the apparatus of example 20, wherein the feedback data includes at least one of position data or orientation data corresponding to a target viewport to be rendered by a decoder.

Example 22 includes the apparatus of example 20, wherein the feedback data includes camera extrinsic parameters.

Example 23 includes the apparatus of example 19, wherein the means for determining is to determine that the atlas includes the view of interest based on a value of a syntax element of the metadata.

Example 24 includes the apparatus of example 19, wherein the means for determining is to determine whether the view of interest is at least one of fully included in the atlas or partially included in the atlas based on the metadata.

Example 25 includes the apparatus of example 19, wherein the means for obtaining is to obtain the bitstream from an encoder via a first network communication and transmit the filtered bitstream to a decoder via a second network communication.

Example 26 includes an apparatus comprising memory, and processor circuitry to execute machine readable instructions to at least obtain a bitstream corresponding to an immersive video, the bitstream including one or more atlases corresponding to one or more views, determine that metadata corresponding to an atlas of the bitstream identifies that at least part of a view of interest corresponds to the atlas, the metadata included in the bitstream, and generate a filtered bitstream by removing atlases that do not identify at least part of the view of interest from the bitstream, the filtered bitstream to be processed to output the immersive video.

Example 27 includes the apparatus of example 26, wherein the processor circuitry is to determine the view of interest based on feedback data.

Example 28 includes the apparatus of example 27, wherein the feedback data includes at least one of position data or orientation data corresponding to a target viewport to be rendered by a decoder.

Example 29 includes the apparatus of example 27, wherein the feedback data includes camera extrinsic parameters.

Example 30 includes the apparatus of example 26, wherein the processor circuitry is to determine that the atlas includes the view of interest based on a value of a syntax element of the metadata.

Example 31 includes the apparatus of example 26, wherein the processor circuitry is to determine whether the view of interest is at least one of fully included in the atlas or partially included in the atlas based on the metadata.

Example 32 includes the apparatus of example 26, wherein the processor circuitry is to obtain the bitstream from an encoder via a first network communication and transmit the filtered bitstream to a decoder via a second network communication.

Example 33 includes the apparatus of example 26, wherein the processor circuitry is to obtain the bitstream from an encoder via a first network communication and transmit the filtered bitstream to a decoder via a bus.

Example 34 includes the apparatus of example 26, wherein the immersive video corresponds to a plurality of views per frame.

Example 35 includes an encoding system comprising an encoder to generate an atlas representative of one or more views, an atlas encoding analyzer to determine that the atlas potentially includes first data related to a first view, determine that the atlas does not include second data related to a second view, a signal indicator to set a first enabled flag to a first value to indicate that the atlas potentially includes the first data related to the first view, and set a second enable flag to a second value to indicate that the atlas does not include the second data related to the second view, and a component interface to include metadata in a bitstream, the metadata including the first enable flag and the second enable flag.

Example 36 includes the encoding system of example 35, wherein the atlas is a first atlas the encoder to generate a second atlas representative of one or more views, the atlas encoding analyzer to determine that a second atlas includes an entire third view, and the signal indicator to set a complete flag to indicate that the entire third view is included in the second atlas, the metadata including the complete flag.

Example 37 includes the encoding system of example 36, further including a syntax generator to generate a complete flag array including complete flags corresponding to different views, the complete flag included in the complete flag array, the complete flag array included in the metadata.

Example 38 includes the encoding system of example 37, wherein the signal indicator is to set ones of a first set of the complete flags to a third value to indicate that first respective views are completely included in the second atlas, and set ones of a second set of the complete flags to a fourth value to indicate that second respective views are not completely included in the second atlas.

Example 39 includes the encoding system of example 35, further including a syntax generator to generate an enable array including enable flags corresponding to different views, the enable flag included in the enable array, the enable array included in the metadata.

Example 40 includes the encoding system of example 39, wherein the enable array includes values indicative of potential views included in the atlas.

Example 41 includes the encoding system of example 35, wherein the atlas encoding analyzer is to determine that all pixels corresponding to a third atlas are occupied.

Example 42 includes the encoding system of example 41, wherein the signal indicator is to set a fully occupied value to indicate all the pixels corresponding to the third atlas are occupied, the metadata including the fully occupied value.

Example 43 includes an encoding system comprising memory, and processor circuitry to execute machine readable instructions to at least generate an atlas representative of one or more views, determine that the atlas potentially includes first data related to a first view, determine that the atlas does not include second data related to a second view, set a first enabled flag to a first value to indicate that the atlas potentially includes the first data related to the first view, and set a second enable flag to a second value to indicate that the atlas does not include the second data related to the second view, and include metadata in a bitstream, the metadata including the first enable flag and the second enable flag.

Example 44 includes the encoding system of example 43, wherein the atlas is a first atlas, the processor circuitry to generate a second atlas representative of one or more views, determine that a second atlas includes an entire third view, and set a complete flag to indicate that the entire third view is included in the second atlas, the metadata including the complete flag.

Example 45 includes the encoding system of example 44, wherein the processor circuitry is to generate a complete flag array including complete flags corresponding to different views, the complete flag included in the complete flag array, the complete flag array included in the metadata.

Example 46 includes the encoding system of example 45, wherein the processor circuitry is to set ones of a first set of the complete flags to a third value to indicate that first respective views are completely included in the second atlas, and set ones of a second set of the complete flags to a fourth value to indicate that second respective views are not completely included in the second atlas.

Example 47 includes the encoding system of example 43, wherein the processor circuitry is to generate an enable array including enable flags corresponding to different views, the enable flag included in the enable array, the enable array included in the metadata.

Example 48 includes the encoding system of example 47, wherein the enable array includes values indicative of potential views included in the atlas.

Example 49 includes the encoding system of example 43, wherein the processor circuitry is to determine that all pixels corresponding to a third atlas are occupied.

Example 50 includes the encoding system of example 49, wherein the processor circuitry is to set a fully occupied value to indicate all the pixels corresponding to the third atlas are occupied, the metadata including the fully occupied value.

Example 51 includes a non-transitory computer readable storage medium comprising instruction which, when executed, cause one or more processors to at least generate an atlas representative of one or more views, determine that the atlas potentially includes first data related to a first view, determine that the atlas does not include second data related to a second view, set a first enabled flag to a first value to indicate that the atlas potentially includes the first data related to the first view, and set a second enable flag to a second value to indicate that the atlas does not include the second data related to the second view, and include metadata in a bitstream, the metadata including the first enable flag and the second enable flag.

Example 52 includes the computer readable storage medium of example 51, wherein the atlas is a first atlas, the instructions to cause the one or more processors to generate a second atlas representative of one or more views, determine that a second atlas includes an entire third view, and set a complete flag to indicate that the entire third view is included in the second atlas, the metadata including the complete flag.

Example 53 includes the computer readable storage medium of example 52, wherein the instructions cause the one or more processors to generate a complete flag array including complete flags corresponding to different views, the complete flag included in the complete flag array, the complete flag array included in the metadata.

Example 54 includes the computer readable storage medium of example 53, wherein the instructions cause the one or more processors to set ones of a first set of the complete flags to a third value to indicate that first respective views are completely included in the second atlas, and set ones of a second set of the complete flags to a fourth value to indicate that second respective views are not completely included in the second atlas.

Example 55 includes the computer readable storage medium of example 51, wherein the instructions cause the one or more processors to an enable array including enable flags corresponding to different views, the enable flag included in the enable array, the enable array included in the metadata.

Example 56 includes the computer readable storage medium of example 55, wherein the enable array includes values indicative of potential views included in the atlas.

Example 57 includes the computer readable storage medium of example 51, wherein the instructions cause the one or more processors to determine that all pixels corresponding to a third atlas are occupied.

Example 58 includes the computer readable storage medium of example 57, wherein the instructions cause the one or more processors to set a fully occupied value to indicate all the pixels corresponding to the third atlas are occupied, the metadata including the fully occupied value.

Example 59 includes a rendering system comprising an interface to obtain a bitstream corresponding to an immersive video, a bitstream analyzer to determine that metadata corresponding to an atlas of the bitstream identifies that at least part of a view of interest corresponds to the atlas, the metadata included in the bitstream, and a filter to generate a filtered bitstream by removing atlases that do not identify at least part of the view of interest from the bitstream, the interface to provide the filtered bitstream to be processed to output the immersive video.

Example 60 includes the rendering system of example 59, further including a feedback data analyzer to determine the view of interest based on feedback data.

Example 61 includes the rendering system of example 60, wherein the feedback data includes at least one of position data or orientation data corresponding to a target viewport to be rendered by a decoder of the rendering system.

Example 62 includes the rendering system of example 60, wherein the feedback data includes camera extrinsic parameters.

Example 63 includes the rendering system of example 59, wherein the bitstream analyzer is to determine that the atlas includes the view of interest based on a value of a syntax element of the metadata.

Example 64 includes the rendering system of example 59, wherein the bitstream analyzer is to determine whether the view of interest is at least one of fully included in the atlas or partially included in the atlas based on the metadata.

Example 65 includes the rendering system of example 59, further including a decoder to decode the filtered bitstream.

Example 66 includes the rendering system of example 65, wherein the interface is to obtain the bitstream from an encoder via a first network communication and transmit the filtered bitstream to the decoder via a bus.

Example 67 includes the rendering system of example 59, wherein the immersive video corresponds to a plurality of views per frame.

Example 68 includes a non-transitory computer readable storage medium comprising instructions which, when executed, cause one or more processors to at least obtain a bitstream corresponding to an immersive video, determine that a metadata corresponding to an atlas of the bitstream identifies that at least part of a view of interest corresponds to the atlas, the metadata included in the bitstream, generate a filtered bitstream by removing atlases that do not identify at least part of the view of interest from the bitstream, and provide the filtered bitstream to be processed to output the immersive video.

Example 69 includes the non-transitory computer readable storage medium of example 68, wherein the instructions cause the one or more processors to determine the view of interest based on feedback data.

Example 70 includes the non-transitory computer readable storage medium of example 69, wherein the feedback data includes at least one of position data or orientation data corresponding to a target viewport to be rendered by a decoder.

Example 71 includes the non-transitory computer readable storage medium of example 69, wherein the feedback data includes camera extrinsic parameters.

Example 72 includes the non-transitory computer readable storage medium of example 68, wherein the instructions cause the one or more processors to determine that the atlas includes the view of interest based on a value of a syntax element of the metadata.

Example 73 includes the non-transitory computer readable storage medium of example 68, wherein the instructions cause the one or more processors to determine whether the view of interest is at least one of fully included in the atlas or partially included in the atlas based on the metadata.

Example 74 includes the non-transitory computer readable storage medium of example 68, wherein the instructions cause the one or more processors to decode the filtered bitstream.

Example 75 includes the non-transitory computer readable storage medium of example 74, wherein the instructions cause the one or more processors to obtain the bitstream from an encoder via a first network communication and transmit the filtered bitstream to a decoder via a bus.

Example 76 includes the non-transitory computer readable storage medium of example 68, wherein the immersive video corresponds to a plurality of views per frame.

Example 77 includes an apparatus comprising means for obtaining a bitstream corresponding to an immersive video, means for determining that a metadata corresponding to an atlas of the bitstream identifies that at least part of a view of interest corresponds to the atlas, the metadata included in the bitstream, and means for generating a filtered bitstream by removing atlases that do not identify at least part of the view of interest from the bitstream, the means for obtaining to provide the filtered bitstream to be processed to output the immersive video.

Example 78 includes the apparatus of example 77, further including second means for determining the view of interest based on feedback data.

Example 79 includes the apparatus of example 78, wherein the feedback data includes at least one of position data or orientation data corresponding to a target viewport to be rendered by a means for decoding.

Example 80 includes the apparatus of example 78, wherein the feedback data includes camera extrinsic parameters.

Example 81 includes the apparatus of example 77, wherein the means for determining is to determine that the atlas includes the view of interest based on a value of a syntax element of the metadata.

Example 82 includes the apparatus of example 77, wherein the means for determining is to determine whether the view of interest is at least one of fully included in the atlas or partially included in the atlas based on the metadata.

Example 83 includes the apparatus of example 77, further including means for decoding the filtered bitstream.

From the foregoing, it will be appreciated that example methods, apparatus and articles of manufacture have been disclosed that sample enabled views per atlas in immersive video. The disclosed methods, apparatus and articles of manufacture can reduce the bandwidth and/or resources required to access and render views of an immersive video by filtering a bitstream to only decode views of interest. Additionally, the disclosed methods, apparatus, and articles of manufacture can reduce bandwidth and/or processor resources by indicating, with a single bit, occupancy of all pixels in an atlas and/or patch when all the pixels are occupied. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   an interface to obtain an encoded bitstream corresponding to an immersive video, the encoded bitstream including one or more atlases corresponding to one or more views;
   bitstream analyzer circuitry to determine that a view is at least partially present in an atlas of the encoded bitstream based on a syntax element corresponding to the atlas; and
   a filter to, before the encoded bitstream is decoded, remove the atlas from the encoded bitstream based on the view not being within a threshold distance of at least part of a view of interest, the view of interest based on a target viewport position provided by a decoder, the interface to provide the encoded bitstream to the decoder, the decoder to decode the encoded bitstream to output the immersive video.

2. The apparatus of claim 1, further including feedback data analyzer circuitry to determine the view of interest based on feedback data provided by the decoder, the feedback data corresponding to a target viewport.

3. The apparatus of claim 2, wherein the feedback data includes at least one of position data or orientation data corresponding to the target viewport, the target viewport to be rendered by the decoder.

4. The apparatus of claim 2, wherein the feedback data includes camera extrinsic parameters.

5. The apparatus of claim 1, wherein the bitstream analyzer circuitry is to determine that the view is at least partially present in the atlas based on a value of the syntax element.

6. The apparatus of claim 1, wherein the bitstream analyzer circuitry is to determine whether the view is at least one of fully included in the atlas or partially included in the atlas based on a value of the syntax element.

7. The apparatus of claim 1, wherein the interface is to obtain the encoded bitstream from an encoder via a first network communication and transmit the encoded bitstream to the decoder via a second network communication.

8. The apparatus of claim 1, wherein the interface is to obtain the encoded bitstream from an encoder via a first network communication and transmit the encoded bitstream to the decoder via a bus.

9. The apparatus of claim 1, wherein the immersive video corresponds to a plurality of views per frame.

10. The apparatus of claim 1, wherein the apparatus further includes feedback data analyzer circuitry to:
   determine the view of interest based on at least one of position data or orientation data corresponding to a target viewport;
   determine a first value corresponding to the view of interest; and
   determine a second value corresponding to the view based on the syntax element; and
   the filter is to remove the atlas from the encoded bitstream when the second value is not within the threshold distance of the first value.

11. A non-transitory computer readable storage medium comprising instructions to cause at least one processor circuit to at least:
   access an encoded bitstream corresponding to an immersive video, the encoded bitstream including one or more atlases corresponding to one or more views;
   determine that a view is at least partially present in an atlas of the encoded bitstream based on a syntax element corresponding to the atlas;
   before the encoded bitstream is decoded, remove the atlas from the encoded bitstream based on the view not being within a threshold distance of at least part of a view of interest, the view of interest based on a target viewport position provided by a decoder; and
   provide the encoded bitstream to the decoder, the decoder to process the encoded bitstream to output the immersive video.

12. The non-transitory computer readable storage medium of claim 11, wherein the instructions cause one or more of the at least one processor circuit to determine the view of interest based on feedback data provided by the decoder, the feedback data corresponding to a target viewport.

13. The non-transitory computer readable storage medium of claim 12, wherein the feedback data includes at least one of position data or orientation data corresponding to the target viewport, the target viewport to be rendered by the decoder.

14. The non-transitory computer readable storage medium of claim 12, wherein the feedback data includes camera extrinsic parameters.

15. The non-transitory computer readable storage medium of claim 11, wherein the instructions cause one or more of the at least one processor circuit to determine that the view is at least partially present in the atlas based on a value of the syntax element.

16. The non-transitory computer readable storage medium of claim 11, wherein the instructions cause one or more of the at least one processor circuit to determine whether the view is at least one of fully included in the atlas or partially included in the atlas based on a value of the syntax element.

17. The non-transitory computer readable storage medium of claim 11, wherein the instructions cause one or more of the at least one processor circuit to access the encoded bitstream from an encoder via a first network communication and cause transmission of the encoded bitstream to the decoder via a second network communication.

18. The non-transitory computer readable storage medium of claim 11, wherein the instructions cause one or more of the at least one processor circuit to access the encoded bitstream from an encoder via a first network communication and cause transmission of the encoded bitstream to the decoder via a bus.

19. The non-transitory computer readable storage medium of claim 11, wherein the immersive video corresponds to a plurality of views per frame.

20. An apparatus comprising:
   memory;
   machine readable instructions; and
   at least one processor circuit to be programmed by the machine readable instructions to at least:
      access an encoded bitstream corresponding to an immersive video, the encoded bitstream including one or more atlases corresponding to one or more views;
      determine that a view is at least partially present in an atlas of the encoded bitstream based on a syntax element corresponding to the atlas; and
      before the encoded bitstream is decoded, remove the atlas from the encoded bitstream to generate a filtered encoded bitstream, removal of the atlas based on the view not being within a threshold distance of at least part of a view of interest, the view of interest based on a target viewport provided by a decoder, the filtered encoded bitstream to be processed by the decoder to output the immersive video.

21. The apparatus of claim 20, wherein one or more of the at least one processor circuit is to determine the view of interest based on feedback data provided by the decoder, the feedback data corresponding to the target viewport.

22. The apparatus of claim 21, wherein the feedback data includes at least one of position data or orientation data corresponding to the target viewport, the target viewport to be rendered by the decoder.

23. The apparatus of claim 20, wherein one or more of the at least one processor circuit is to determine that the view is at least partially present in the atlas based on a value of the syntax element.

24. The apparatus of claim 20, wherein one or more of the at least one processor circuit is to determine whether the view is at least one of fully included in the atlas or partially included in the atlas based on a value of the syntax element.

25. The apparatus of claim 20, wherein one or more of the at least one processor circuit is to access the encoded bitstream from an encoder via a first network communication and cause transmission of the filtered encoded bitstream to the decoder via a second network communication.

\* \* \* \* \*